(12) United States Patent
Sudo et al.

(10) Patent No.: US 10,908,400 B2
(45) Date of Patent: Feb. 2, 2021

(54) ZOOM LENS, IMAGE PICKUP APPARATUS INCLUDING THE SAME, AND CONTROL DEVICE FOR THE SAME

(71) Applicant: CANON KABUSHIKI KAISHA, Tokyo (JP)

(72) Inventors: Kenta Sudo, Utsunomiya (JP); Hirofumi Abe, Utsunomiya (JP); Yu Inomoto, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 568 days.

(21) Appl. No.: 15/833,340

(22) Filed: Dec. 6, 2017

(65) Prior Publication Data

US 2018/0164557 A1  Jun. 14, 2018

(30) Foreign Application Priority Data

Dec. 9, 2016 (JP) .................................. 2016-239811
Dec. 9, 2016 (JP) .................................. 2016-239812
Dec. 9, 2016 (JP) .................................. 2016-239813

(51) Int. Cl.
*G02B 15/173* (2006.01)
*G02B 13/02* (2006.01)
*H04N 5/232* (2006.01)

(52) U.S. Cl.
CPC ........... *G02B 15/173* (2013.01); *G02B 13/02* (2013.01); *H04N 5/23296* (2013.01)

(58) Field of Classification Search
CPC ........................... G02B 13/02; H04N 5/23296

(Continued)

(56) References Cited

U.S. PATENT DOCUMENTS 4,836,662 A * 6/1989 Ogata .................. G02B 15/173
                                                  359/690
5,543,969 A   8/1996 Ito
(Continued)

FOREIGN PATENT DOCUMENTS

CN         103957358 A      7/2014
CN         104076495 A      10/2014
(Continued)

OTHER PUBLICATIONS

Kudo, K., "Basic physical property diagram mainly described the spectroscopic characteristics", 1972, pp. 572-580 Applicant's explanation re Kudo reference: "refractive index of ZnS is described by Tables 94.3 and 94.4".

*Primary Examiner* — Travis S Fissel
(74) *Attorney, Agent, or Firm* — Canon U.S.A., Inc., IP Division

(57) ABSTRACT

A zoom lens includes, in order from an object side to an image side, a first lens unit having a positive refractive power; a second lens unit having a negative refractive power; and a third lens unit having a positive refractive power. The first lens unit does not move and the second lens unit and the third lens unit move in mutually different loci during zooming. Conditional expressions are satisfied as follows:

0.05<|f2/m2|<0.59, and 0.20<|f3/m3|<1.95, where f2 is a focal length of the second lens unit, f3 is a focal length of the third lens unit, m2 is a moving amount of the second lens unit during zooming from a wide-angle end to a telephoto end, and m3 is a moving amount of the third lens unit during zooming from the wide-angle end to the telephoto end.

30 Claims, 27 Drawing Sheets

(58) Field of Classification Search
USPC .......................................... 359/684, 689, 690
See application file for complete search history.

(56) References Cited

U.S. PATENT DOCUMENTS

| | | | |
|---|---|---|---|
| 6,307,685 B1 | 10/2001 | Mori et al. | |
| 2003/0210470 A1 | 11/2003 | Zimmer et al. | |
| 2009/0295982 A1* | 12/2009 | Eguchi | G02B 15/142 |
| | | | 348/347 |
| 2013/0003191 A1* | 1/2013 | Kanai | G02B 15/173 |
| | | | 359/690 |
| 2013/0100539 A1* | 4/2013 | Mitsuhashi | G02B 15/173 |
| | | | 359/690 |
| 2016/0109691 A1 | 4/2016 | Kajiyama et al. | |
| 2016/0147048 A1 | 5/2016 | Nakano et al. | |

FOREIGN PATENT DOCUMENTS

| | | |
|---|---|---|
| CN | 106707476 A | 5/2017 |
| JP | S52-120851 A | 10/1977 |
| JP | H06-258577 A | 9/1994 |
| JP | 2007-233026 A | 9/2007 |
| JP | 2009-294304 A | 12/2009 |
| JP | 2012-159728 A | 8/2012 |
| JP | 2013-88782 A | 5/2013 |
| JP | 2016-080975 A | 5/2016 |
| JP | 2016-099549 A | 5/2016 |

* cited by examiner

ZOOM LENS, IMAGE PICKUP APPARATUS INCLUDING THE SAME, AND CONTROL DEVICE FOR THE SAME

BACKGROUND OF THE INVENTION

Field of the Invention

The present invention relates to a zoom lens, an image pickup apparatus including the zoom lens, and a control device for the zoom lens, and is suitable for, for example, image pickup apparatuses including image pickup devices, such as a digital still camera, a video camera, a monitoring camera, and a broadcast camera, or image pickup apparatuses such as a silver-halide-film camera.

Description of the Related Art

Recent image pickup apparatuses including solid-state image pickup devices, such as a monitoring camera and a video camera, have improved functions while the total sizes thereof are small. Zoom lenses used for such apparatuses are desired to have small size, high zoom ratios, and good optical performance.

To meet this, there is known a zoom lens including, in order from an object side to an image side, a lens unit having a positive refractive power, a lens unit having a negative refractive power, and a lens unit having a positive refractive power.

Japanese Patent Laid-Open No. 2013-88782 discloses a zoom lens in which a focal length of a third lens unit is appropriately set to improve imaging performance for light in a wide wavelength range from a visible range to a near-infrared range.

In the zoom lens disclosed in Japanese Patent Laid-Open No. 2013-88782, it cannot be said that the structures and movement loci of the second and third lens units are appropriate in the viewpoints of reduction in size and increase in zoom ratio of the entire system. To attain further reduction in size and increase in zoom ratio of the zoom lens, it is important to appropriately set the structures and movement loci of the second and third lens units.

SUMMARY OF THE INVENTION

The present invention provides a zoom lens, the entire system of the zoom lens being small and having a high zoom ratio, the zoom lens having high optical performance in the entire zoom range; an image pickup apparatus including the zoom lens; and a control device for the zoom lens.

The present invention provides a zoom lens including, in order from an object side to an image side, a first lens unit having a positive refractive power; a second lens unit having a negative refractive power; and a third lens unit having a positive refractive power. The first lens unit does not move and the second lens unit and the third lens unit move in mutually different loci during zooming. Conditional expressions are satisfied as follows:

$$0.05 < |f2/m2| < 0.59, \text{ and}$$

$$0.20 < |f3/m3| < 1.95,$$

where f2 is a focal length of the second lens unit, f3 is a focal length of the third lens unit, m2 is a moving amount of the second lens unit during zooming from a wide-angle end to a telephoto end, and m3 is a moving amount of the third lens unit during zooming from the wide-angle end to the telephoto end.

Further features of the present invention will become apparent from the following description of exemplary embodiments with reference to the attached drawings.

DESCRIPTION OF THE EMBODIMENTS

A zoom lens, an image pickup apparatus including the zoom lens, and a control device for the zoom lens according to each of embodiments of the present invention are described below in detail with reference the accompanying drawings. The zoom lens according to any of the embodiments of the present invention includes, in order from an object side to an image side, a first lens unit having a positive refractive power, a second lens unit having a negative refractive power, and a third lens unit having a positive refractive power. In this case, a lens unit is only required to include at least one lens that is a lens element that moves as a unit during zooming. The lens unit does not have to necessarily include a plurality of lenses. A sectional view of a zoom lens in each drawing is at a wide-angle end. Also, aberration charts in each drawing illustrates, in order from an upper side, aberrations at the wide-angle end, aberrations at an intermediate zooming position, and aberrations at a telephoto end.

Figure 1:
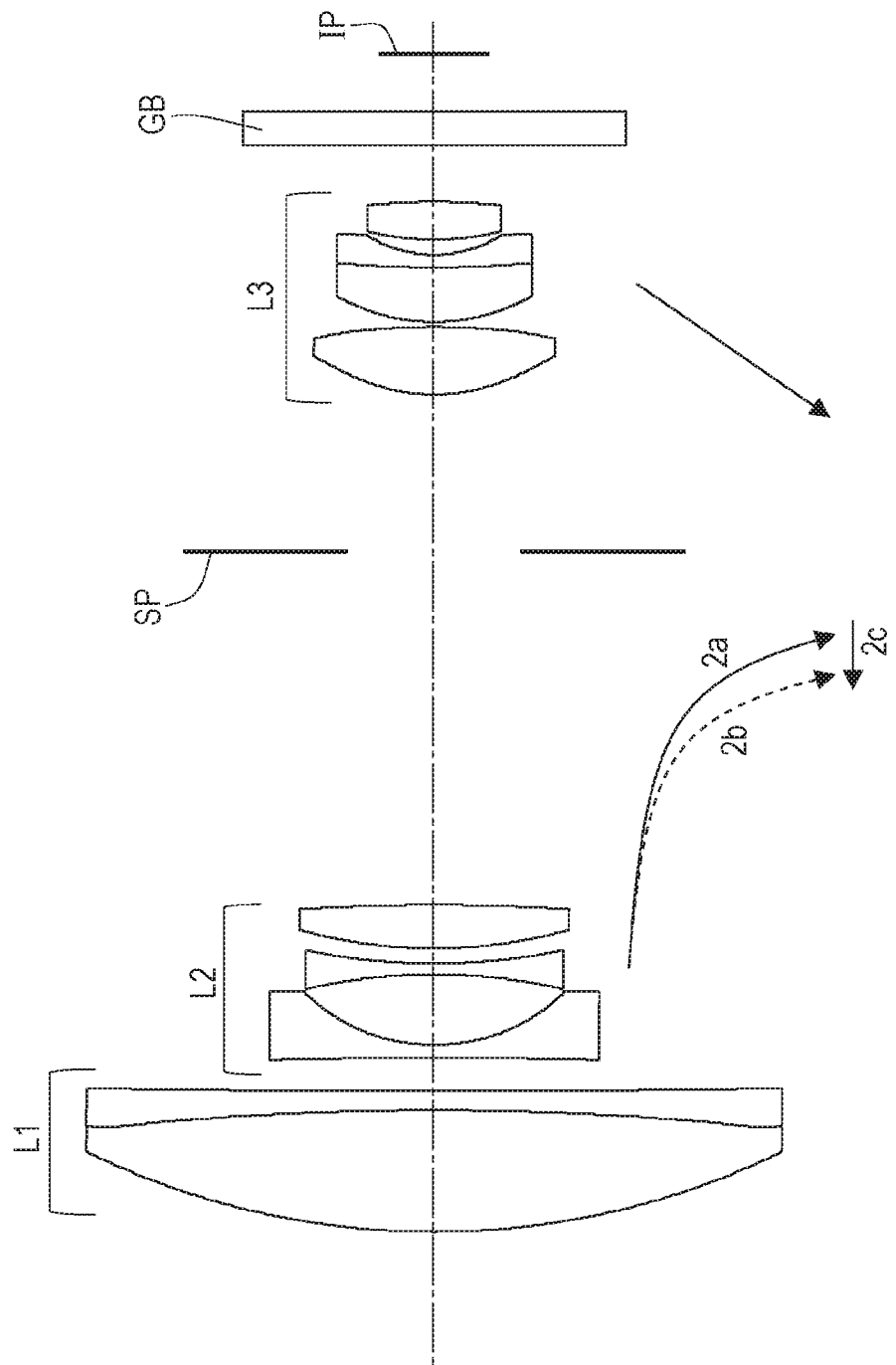
FIG. 1 is a sectional view of a zoom lens according to Embodiment 1.
Figure 2:
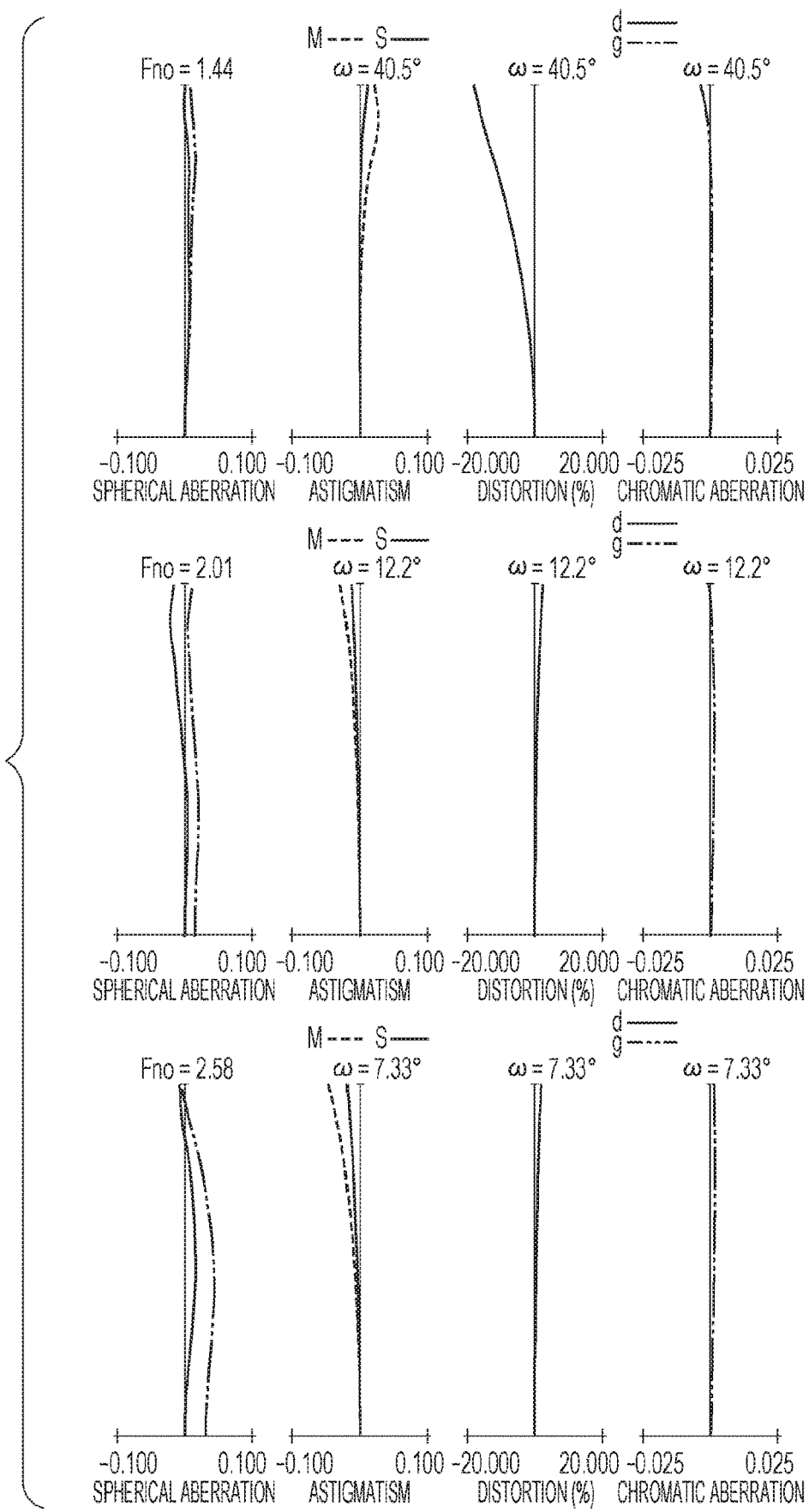
FIG. 2 provides aberration charts of the zoom lens according to Embodiment 1.
Figure 3:
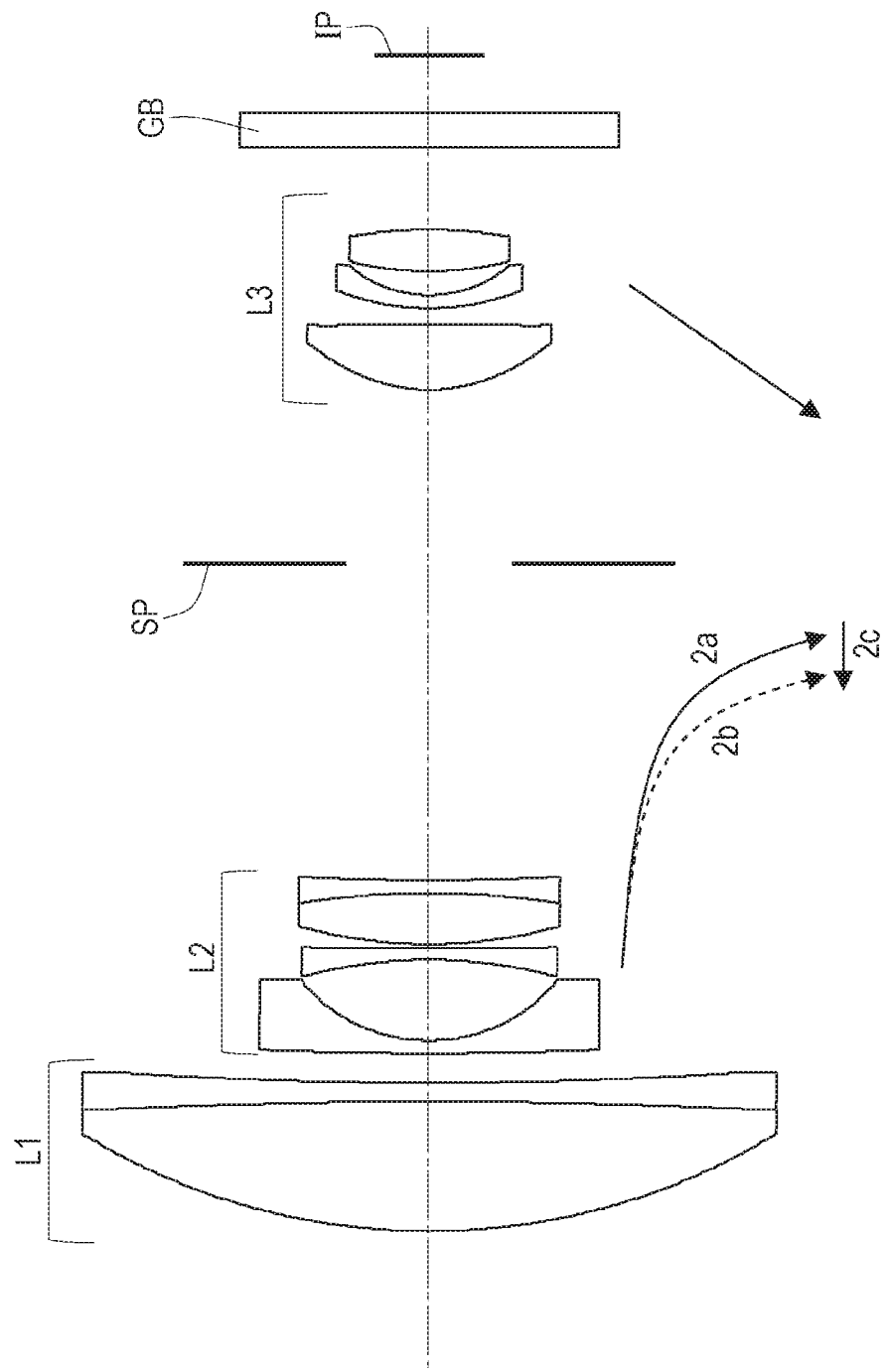
FIG. 3 is a sectional view of a zoom lens according to Embodiment 2.
Figure 4:
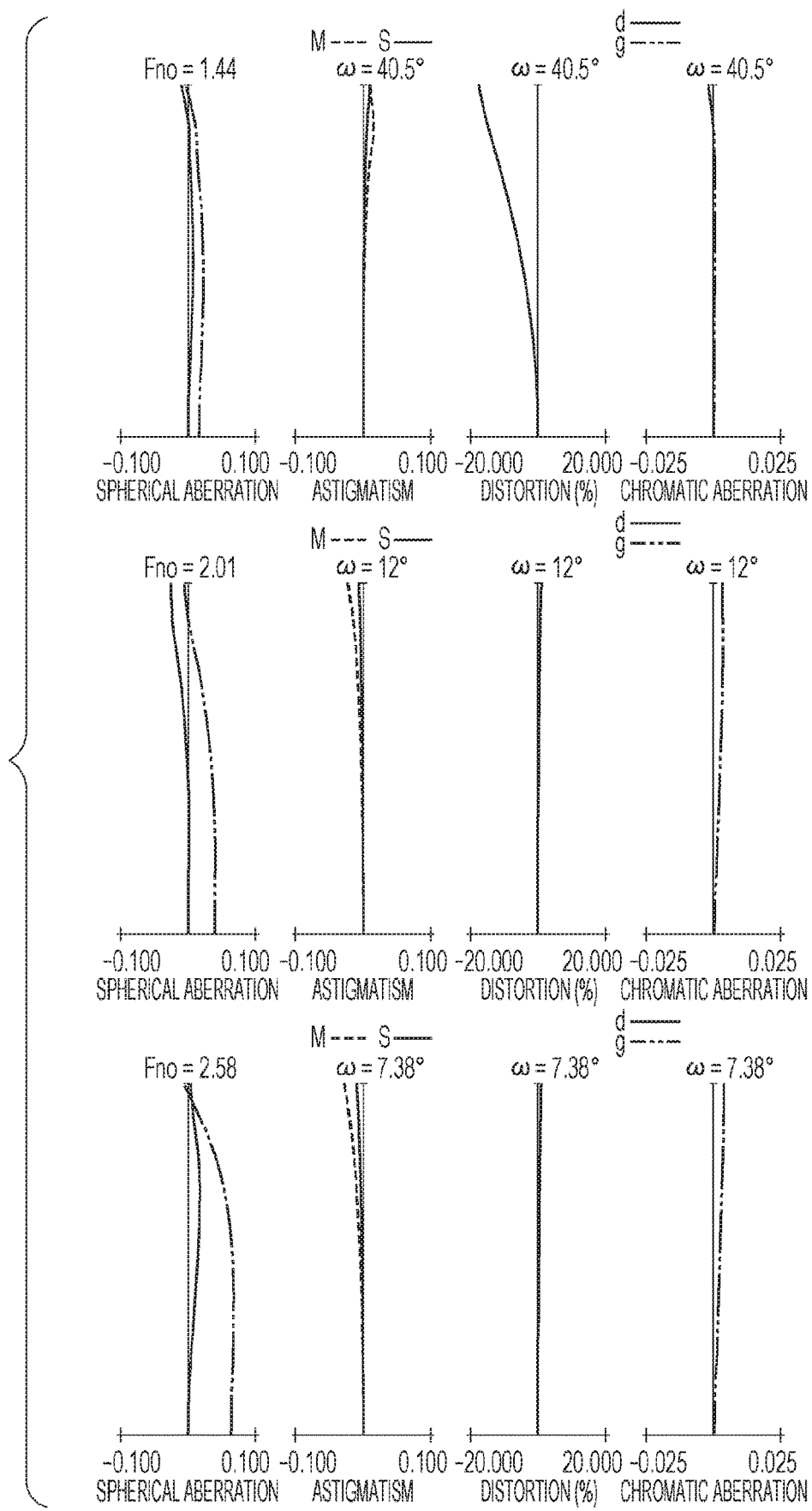
FIG. 4 provides aberration charts of the zoom lens according to Embodiment 2.

FIG. 1 is a sectional view of a zoom lens according to Embodiment 1. FIG. 2 provides aberration charts of the zoom lens according to Embodiment 1. The zoom lens according to Embodiment 1 has a zoom ratio of 5.35, and an F-number of about 1.44 to 2.58. FIG. 3 is a sectional view of a zoom lens according to Embodiment 2. FIG. 4 provides aberration charts of the zoom lens according to Embodiment 2. The zoom lens according to Embodiment 2 has a zoom ratio of 5.36, and an F-number of about 1.44 to 2.58.

Figure 5:
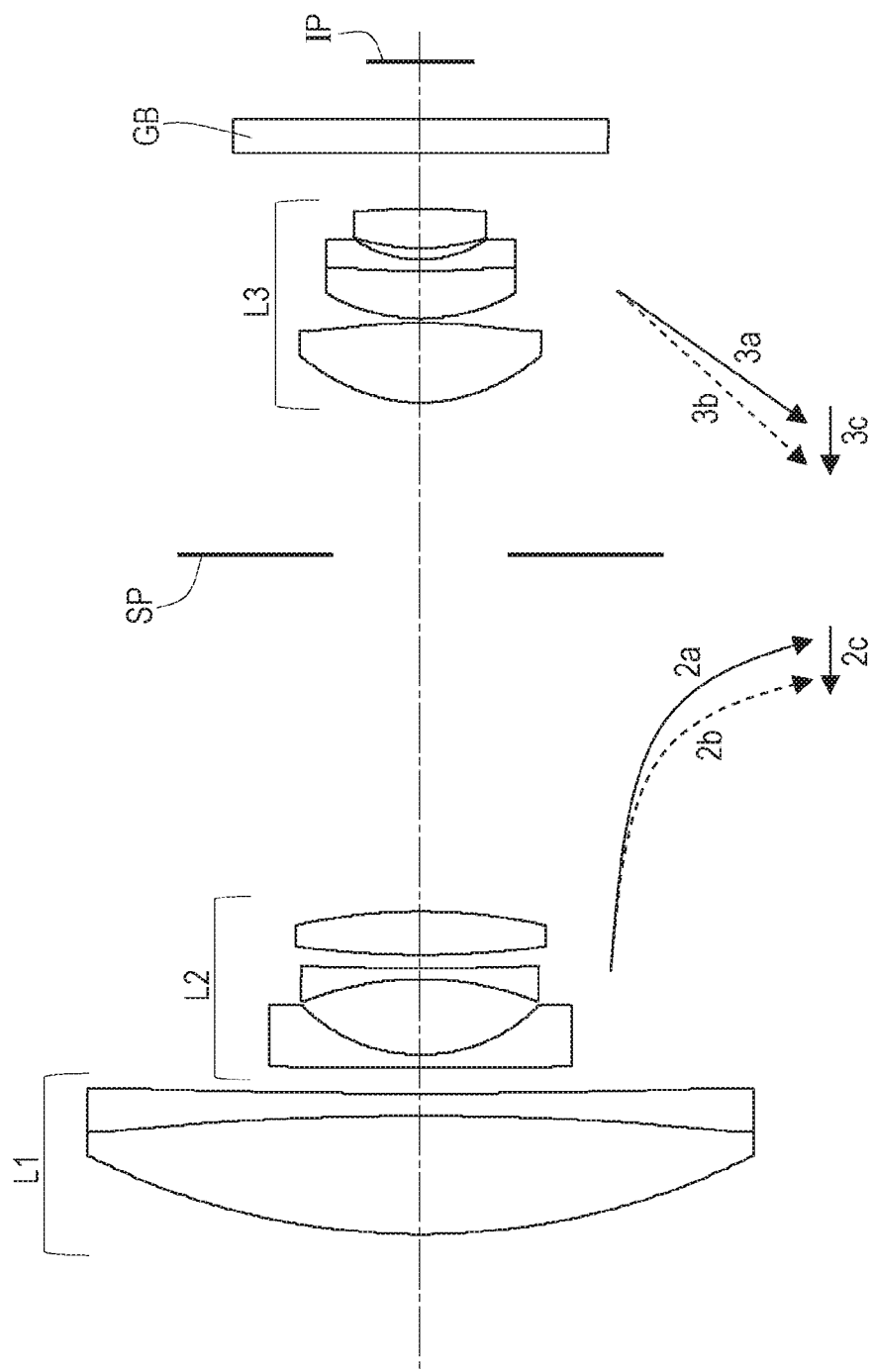
FIG. 5 is a sectional view of a zoom lens according to Embodiment 3.
Figure 6:
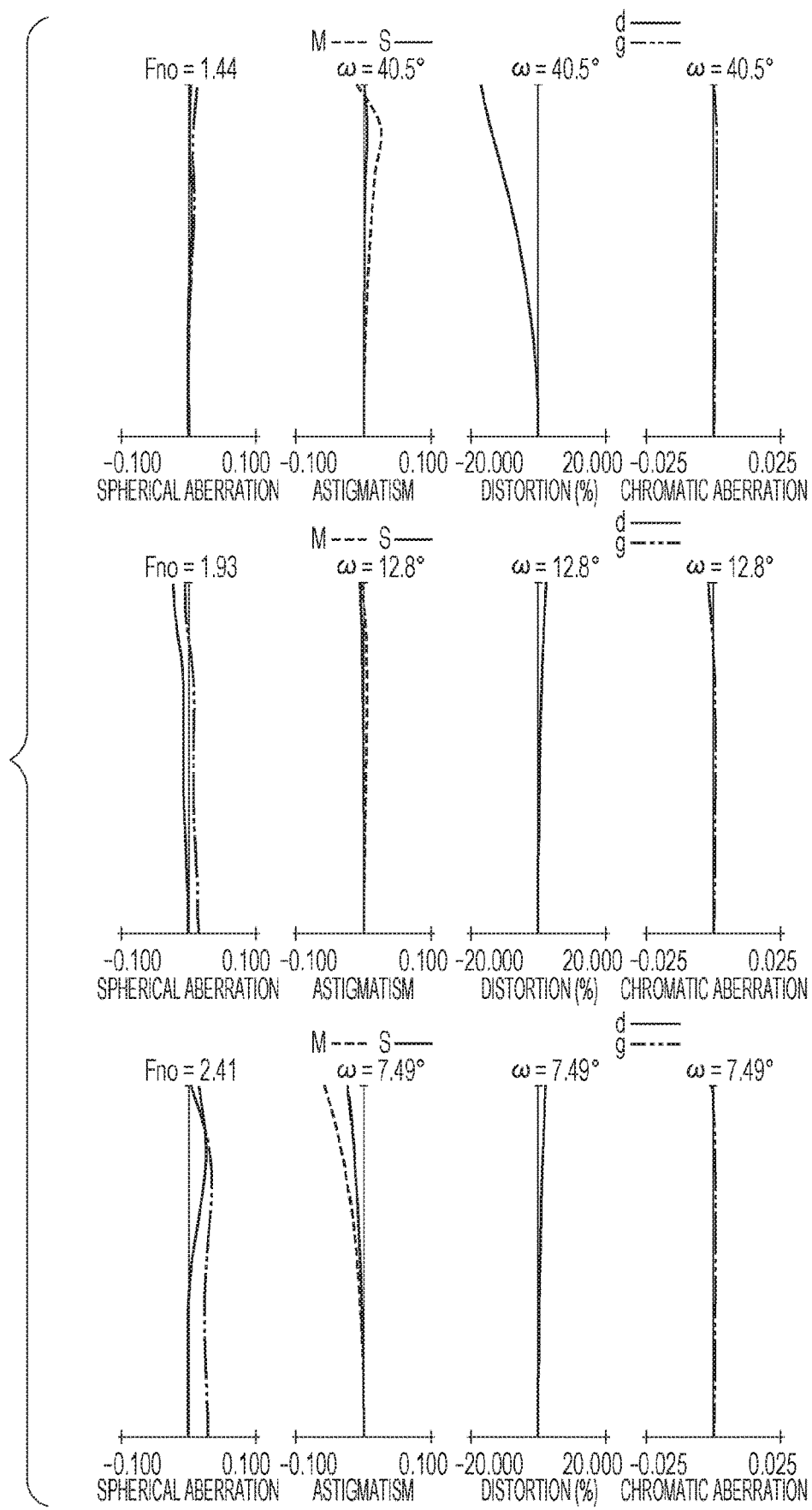
FIG. 6 provides aberration charts of the zoom lens according to Embodiment 3.
Figure 7:
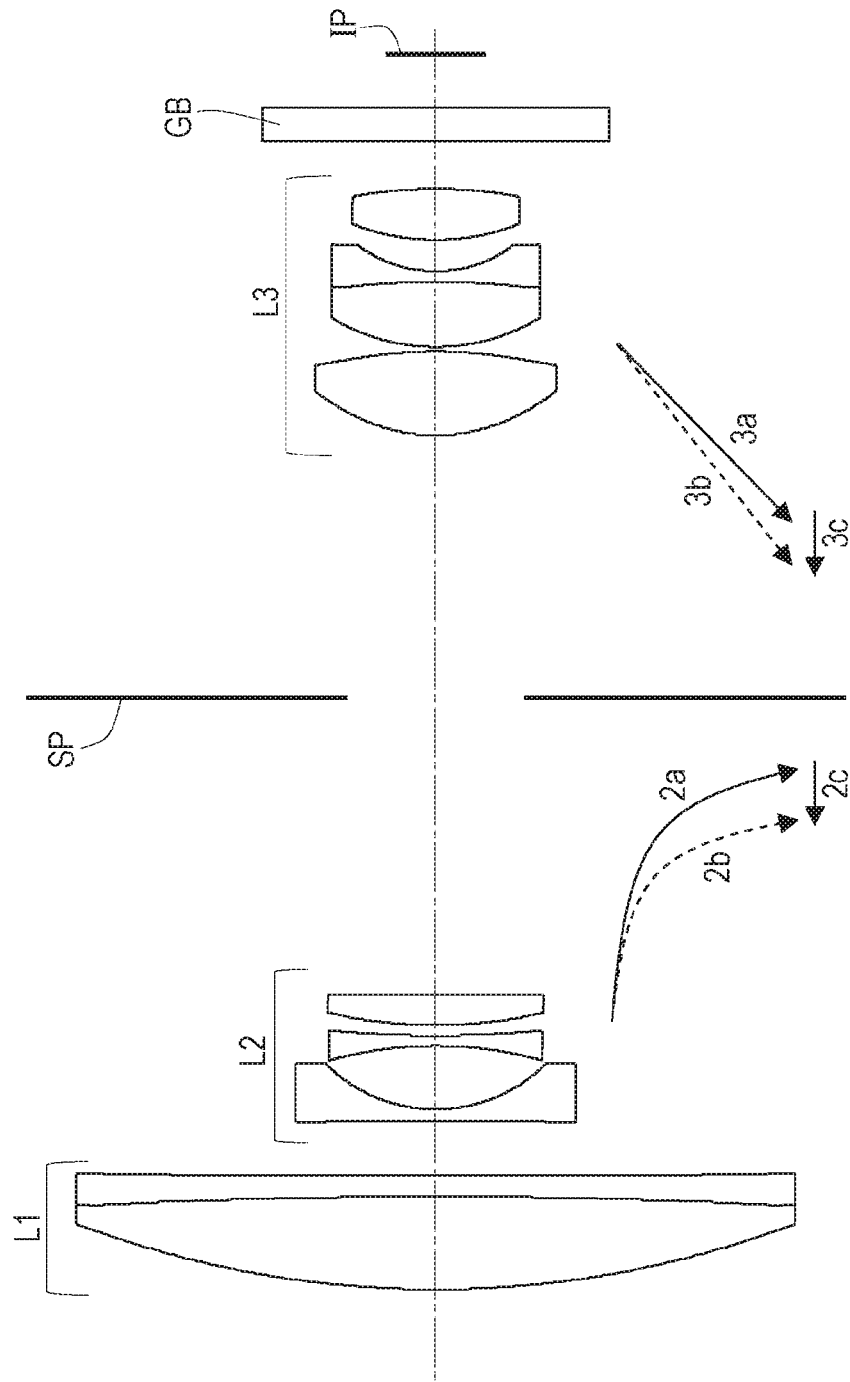
FIG. 7 is a sectional view of a zoom lens according to Embodiment 4.
Figure 8:
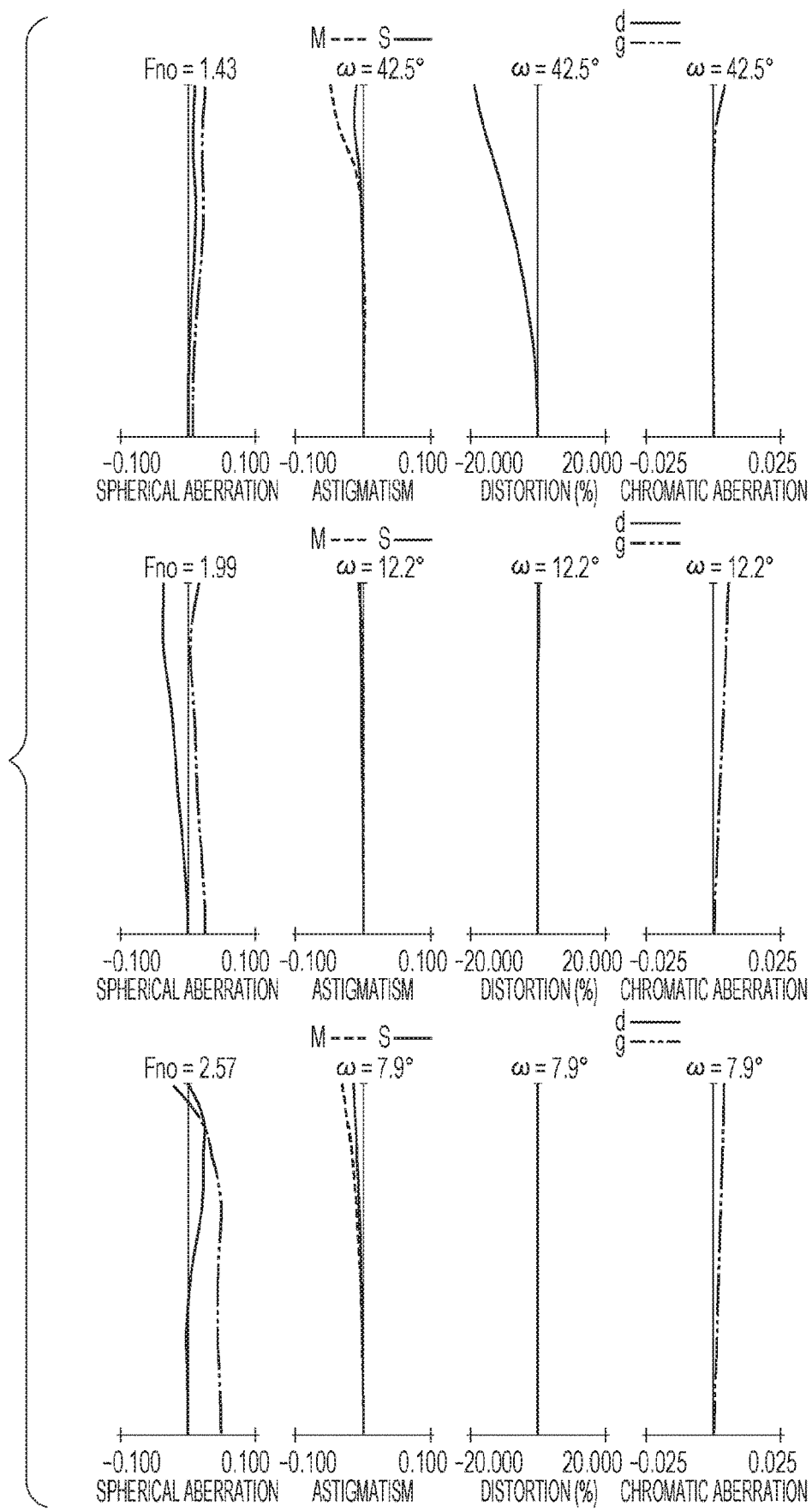
FIG. 8 provides aberration charts of the zoom lens according to Embodiment 4.

FIG. 5 is a sectional view of a zoom lens according to Embodiment 3. FIG. 6 provides aberration charts of the zoom lens according to Embodiment 3. The zoom lens according to Embodiment 3 has a zoom ratio of 5.28, and an F-number of about 1.44 to 2.41. FIG. 7 is a sectional view of a zoom lens according to Embodiment 4. FIG. 8 provides aberration charts of the zoom lens according to Embodiment 4. The zoom lens according to Embodiment 4 has a zoom ratio of 5.35, and an F-number of about 1.42 to 2.57.

Figure 9:
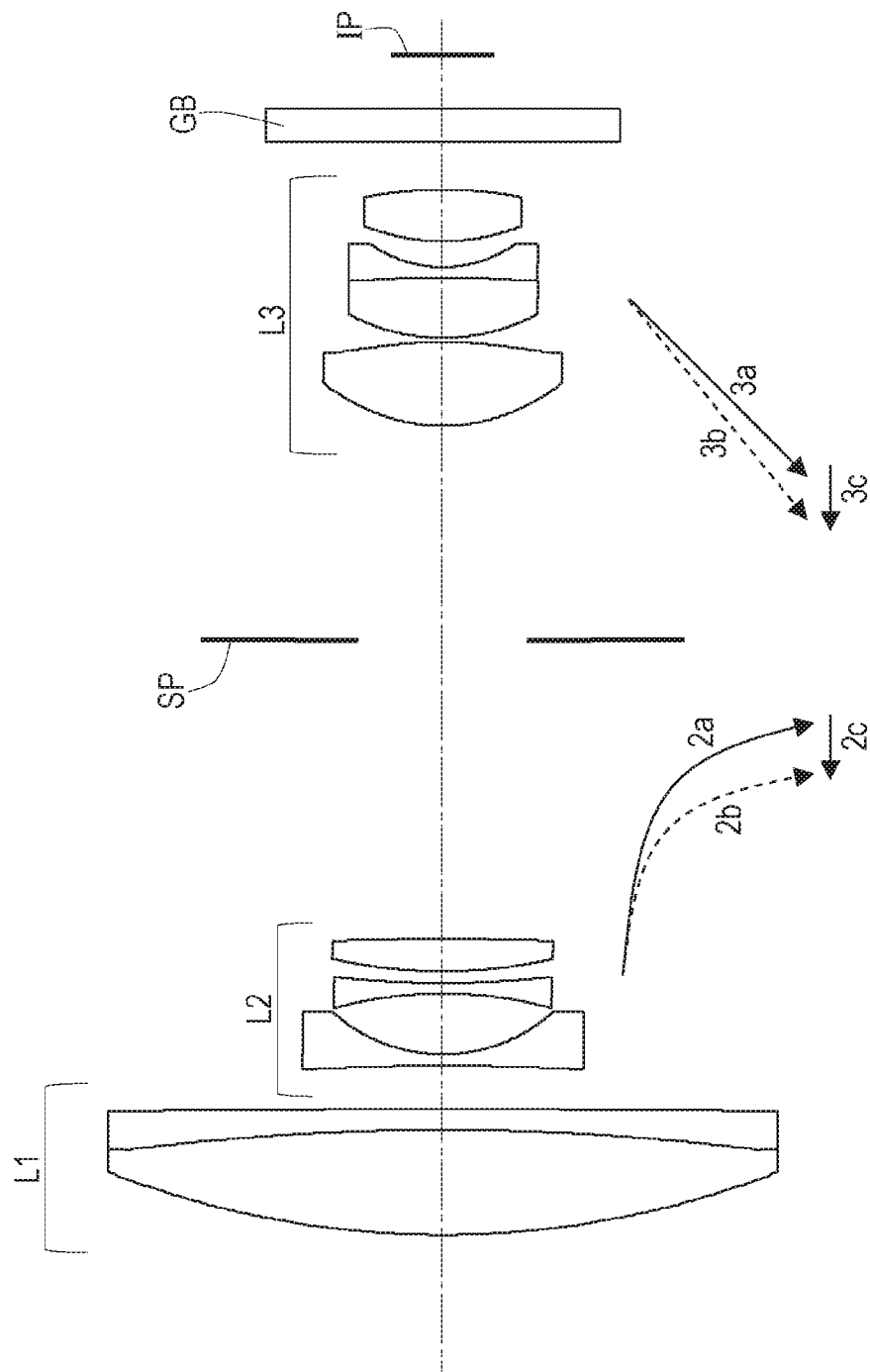
FIG. 9 is a sectional view of a zoom lens according to Embodiment 5.
Figure 10:
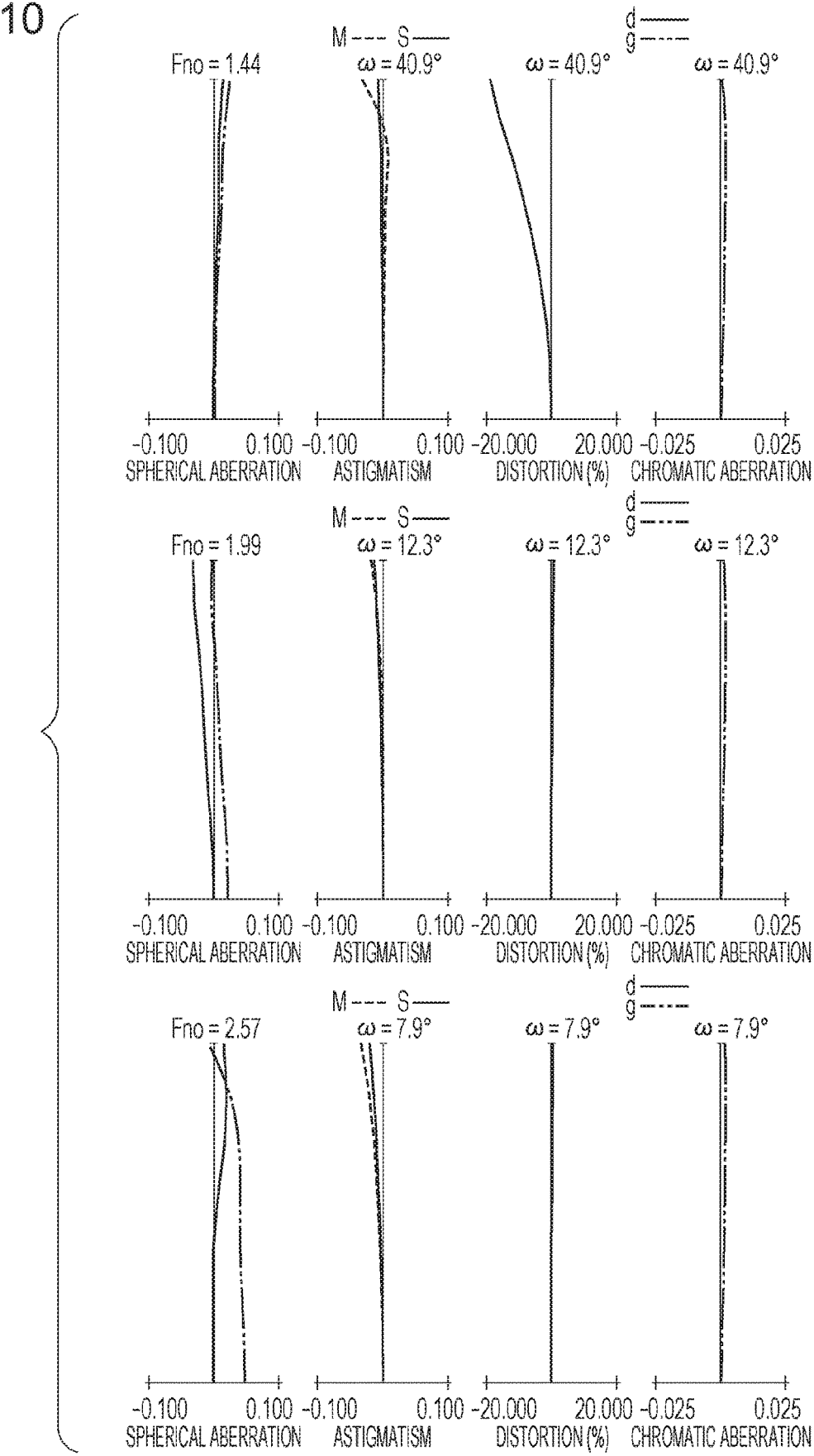
FIG. 10 provides aberration charts of the zoom lens according to Embodiment 5.
Figure 11:
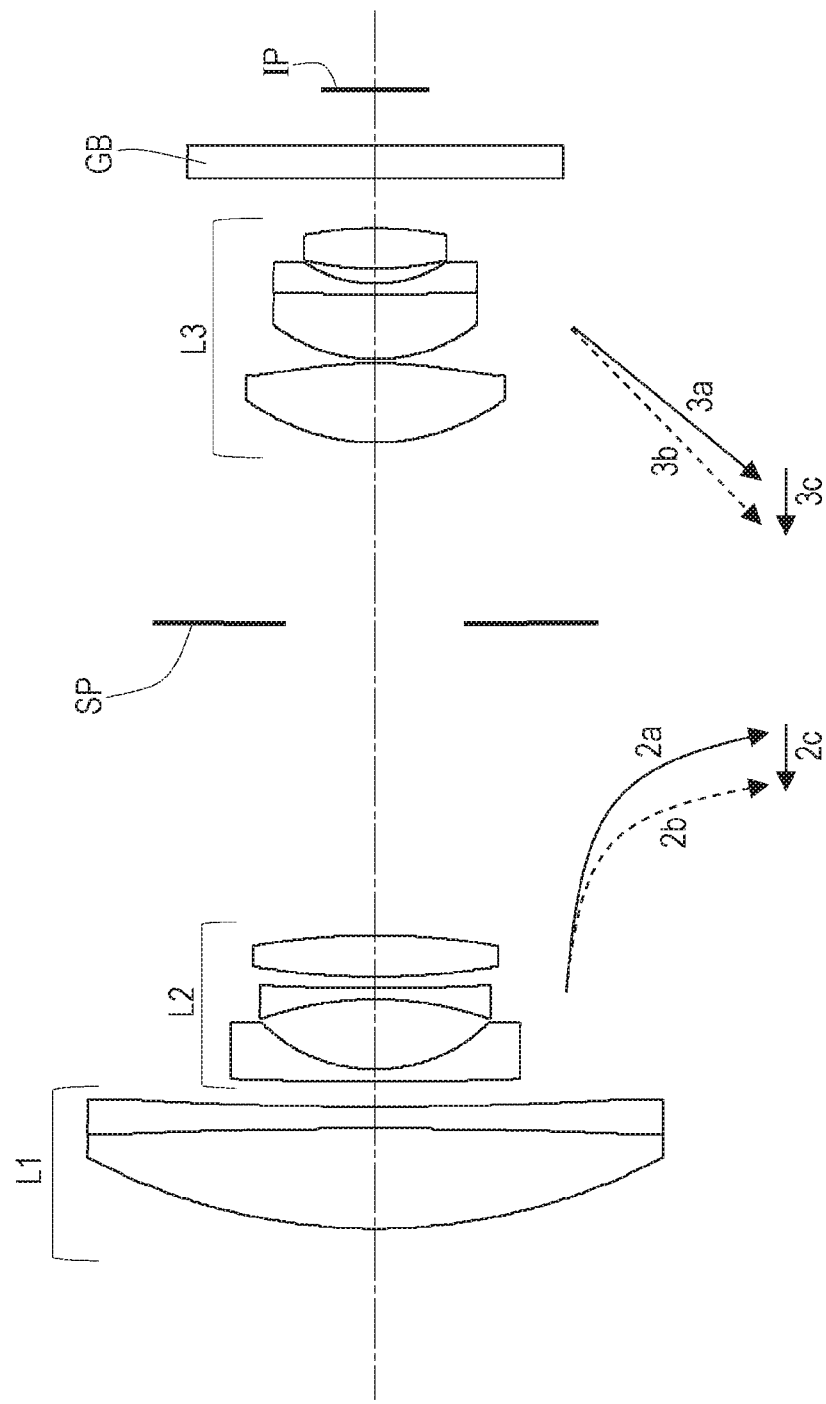
FIG. 11 is a sectional view of a zoom lens according to Embodiment 6.
Figure 12:
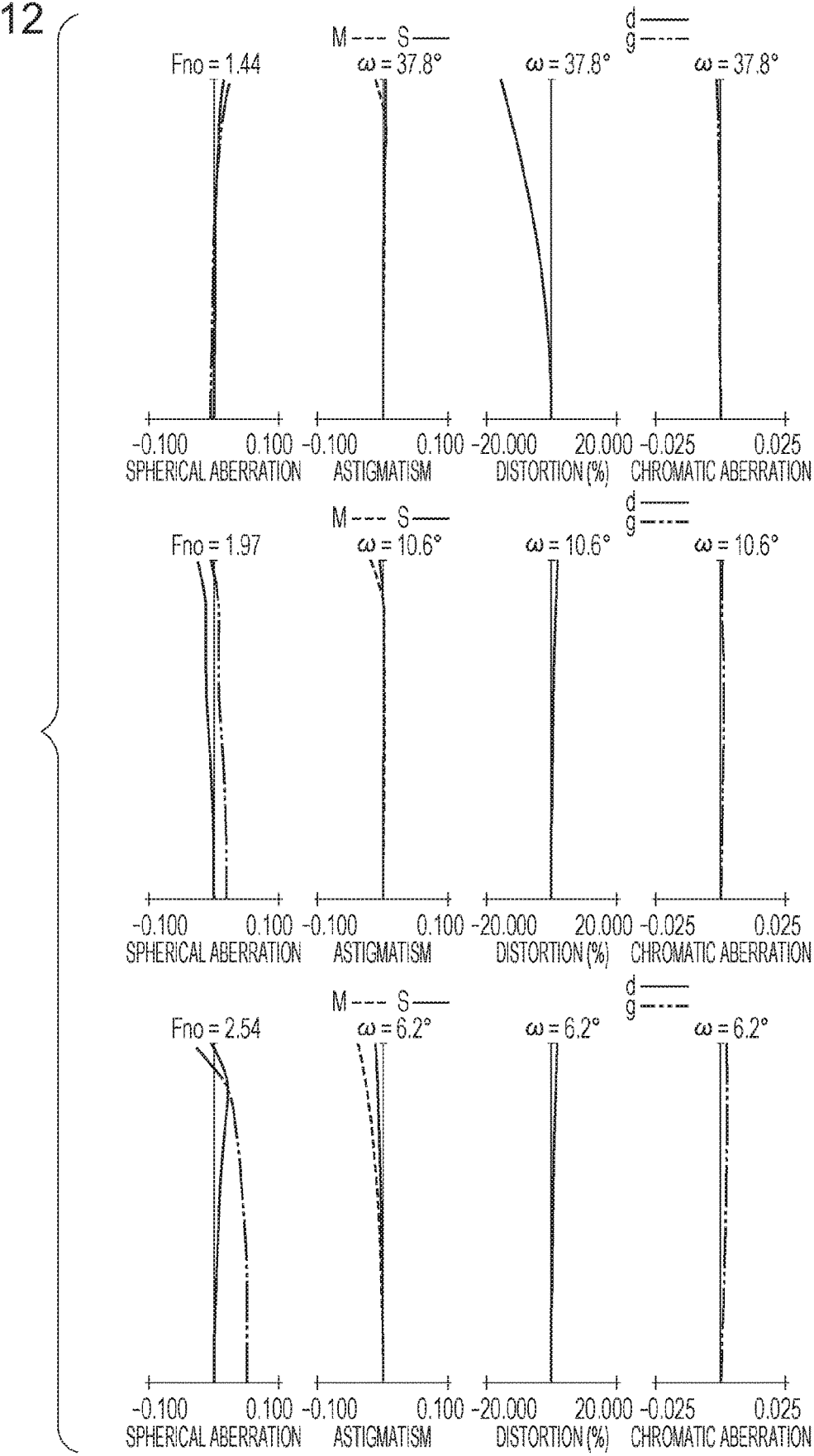
FIG. 12 provides aberration charts of the zoom lens according to Embodiment 6.

FIG. 9 is a sectional view of a zoom lens according to Embodiment 5. FIG. 10 provides aberration charts of the zoom lens according to Embodiment 5. The zoom lens according to Embodiment 5 has a zoom ratio of 5.05, and an F-number of about 1.44 to 2.57. FIG. 11 is a sectional view of a zoom lens according to Embodiment 6. FIG. 12 provides aberration charts of the zoom lens according to Embodiment 6. The zoom lens according to Embodiment 6 has a zoom ratio of 5.92, and an F-number of about 1.44 to 2.54.

Figure 13:
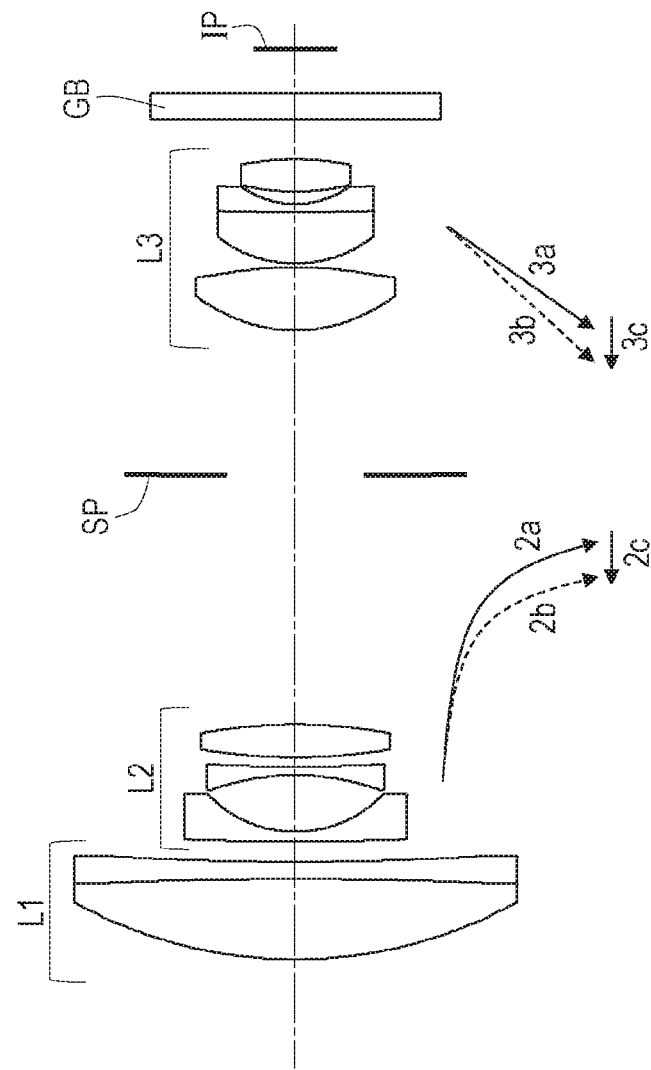
FIG. 13 is a sectional view of a zoom lens according to Embodiment 7.
Figure 14:
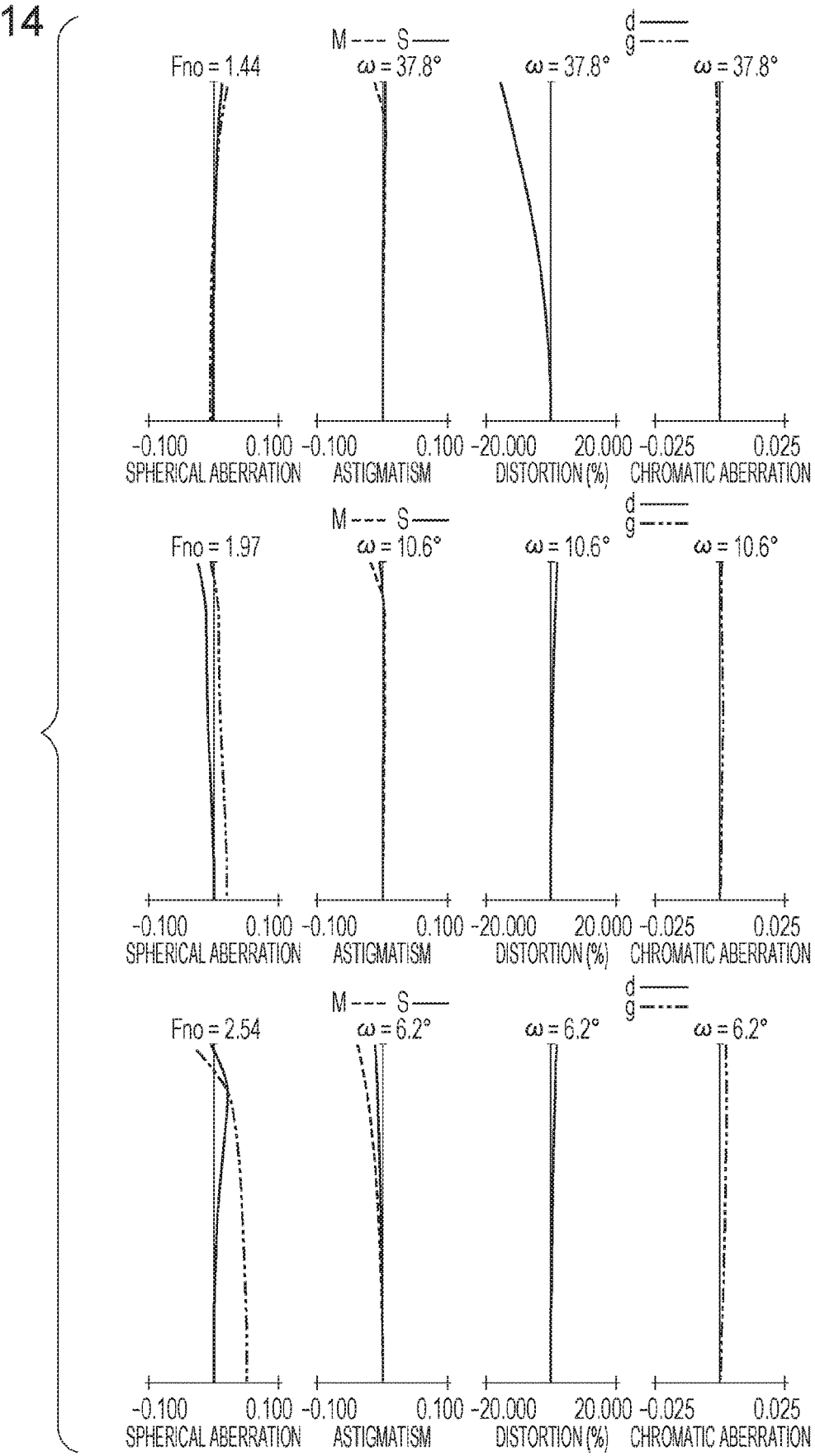
FIG. 14 provides aberration charts of the zoom lens according to Embodiment 7.

FIG. 13 is a sectional view of a zoom lens according to Embodiment 7. FIG. 14 provides aberration charts of the zoom lens according to Embodiment 7. The zoom lens according to Embodiment 7 has a zoom ratio of 5.92, and an F-number of about 1.44 to 2.54.

Figure 15:
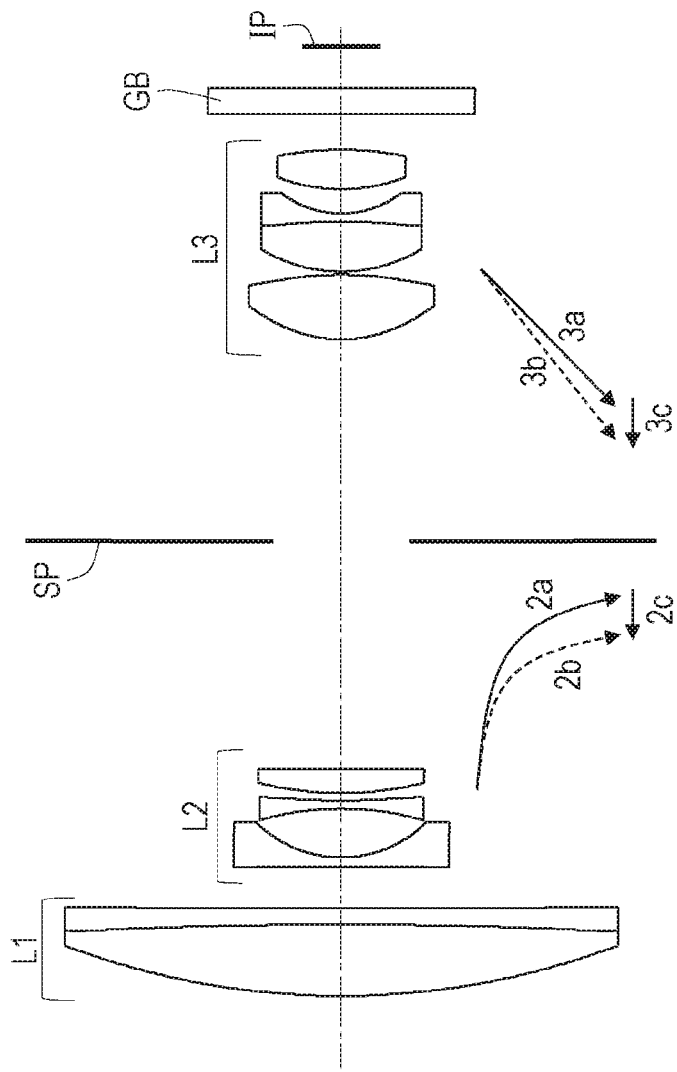
FIG. 15 is a sectional view of a zoom lens according to Embodiment 8.
Figure 16:
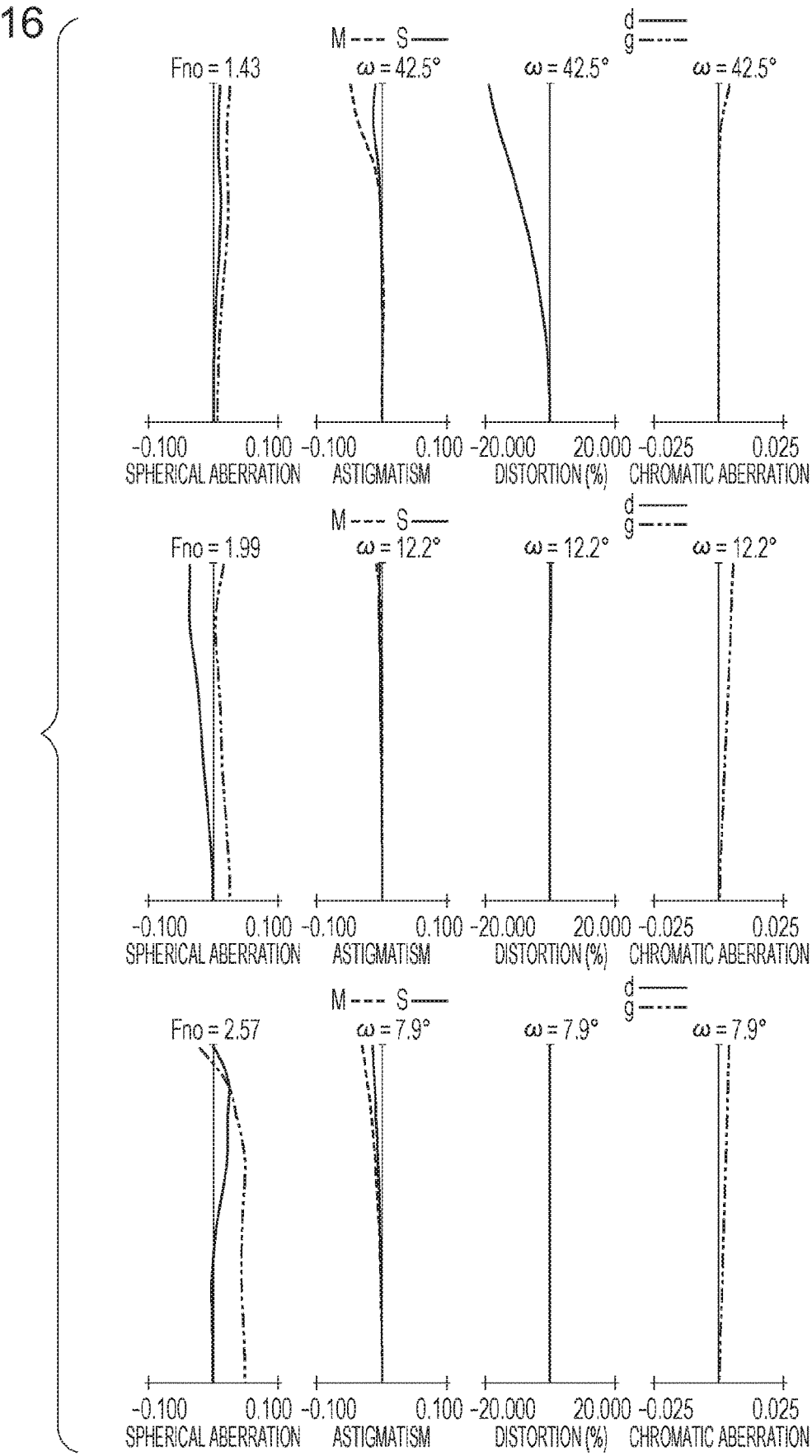
FIG. 16 provides aberration charts of the zoom lens according to Embodiment 8.
Figure 17:
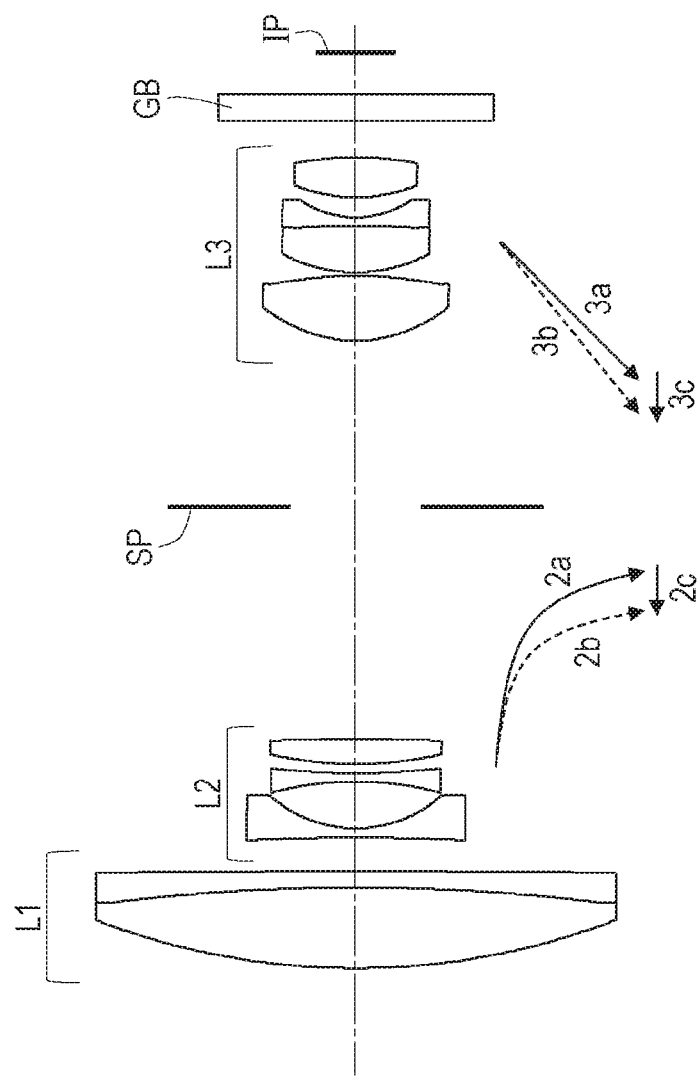
FIG. 17 is a sectional view of a zoom lens according to Embodiment 9.
Figure 18:
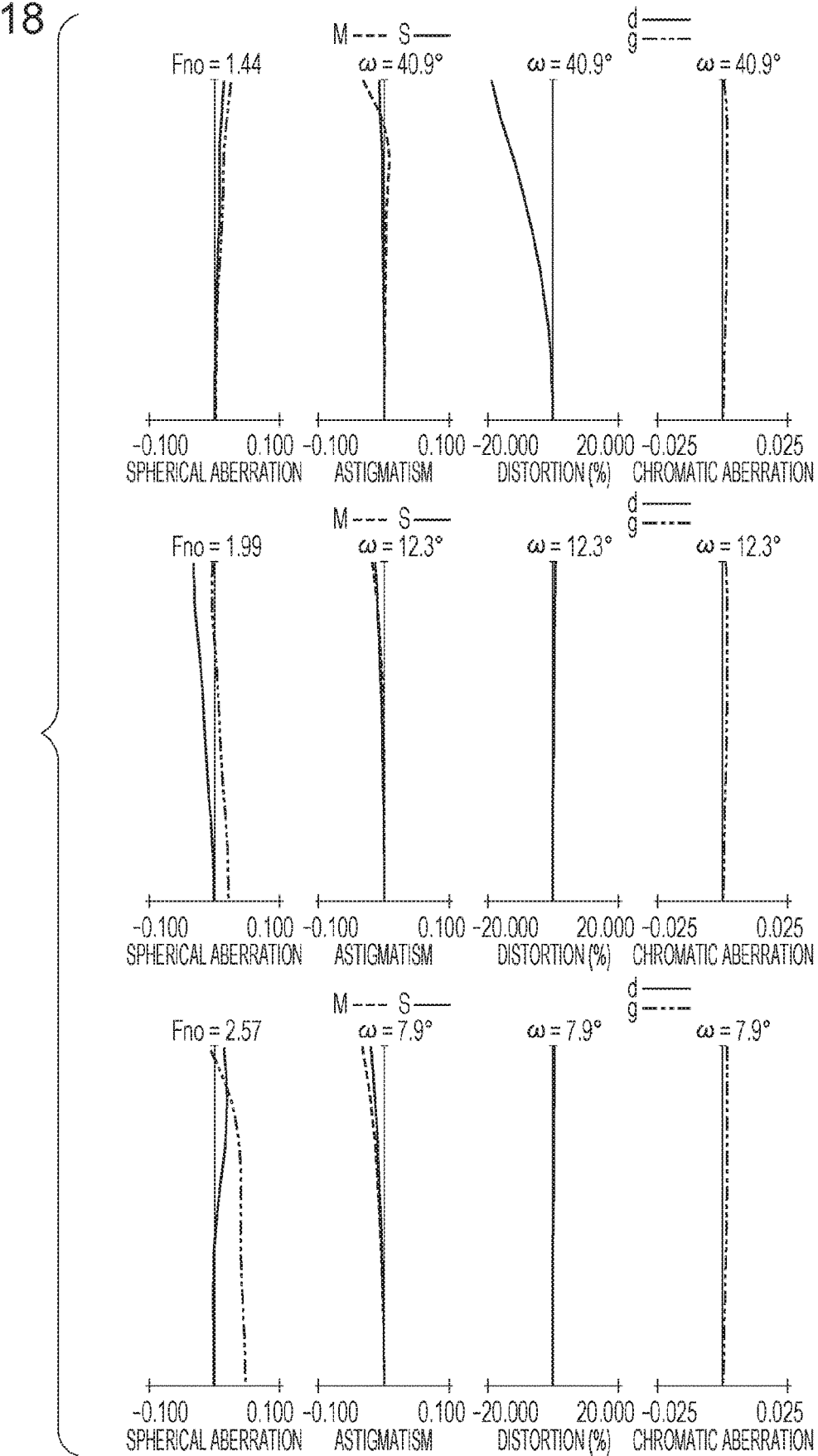
FIG. 18 provides aberration charts of the zoom lens according to Embodiment 9.

FIG. 15 is a sectional view of a zoom lens according to Embodiment 8. FIG. 16 provides aberration charts of the zoom lens according to Embodiment 8. The zoom lens according to Embodiment 8 has a zoom ratio of 5.35, and an F-number of about 1.42 to 2.57. FIG. 17 is a sectional view of a zoom lens according to Embodiment 9. FIG. 18 provides aberration charts of the zoom lens according to Embodiment 9. The zoom lens according to Embodiment 9 has a zoom ratio of 5.05, and an F-number of about 1.44 to 2.57.

Figure 19:
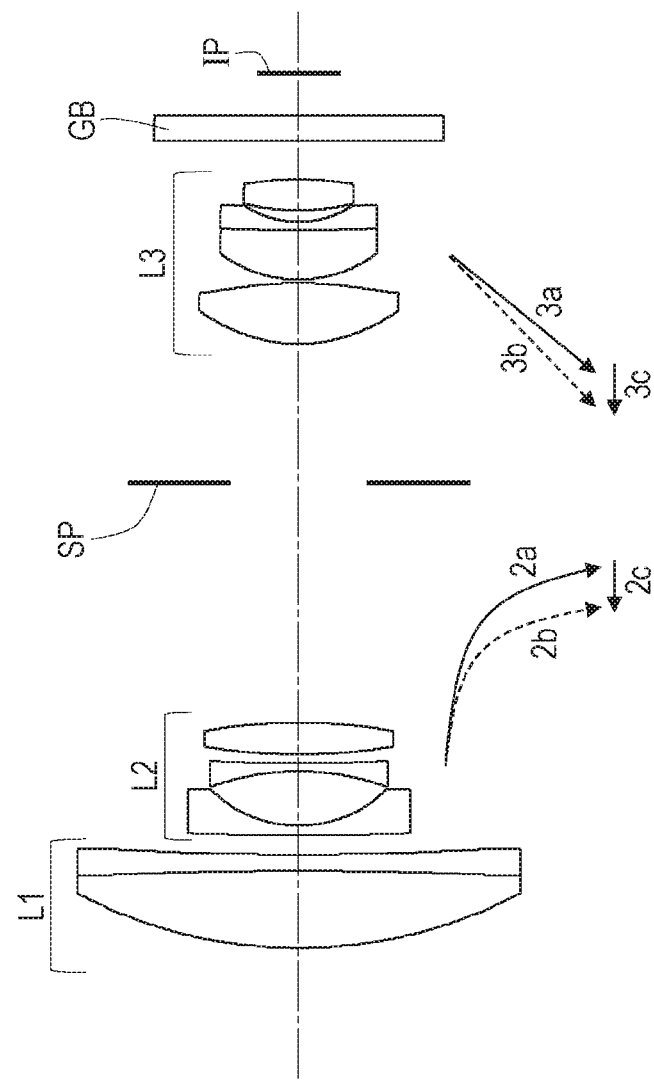
FIG. 19 is a sectional view of a zoom lens according to Embodiment 10.
Figure 20:
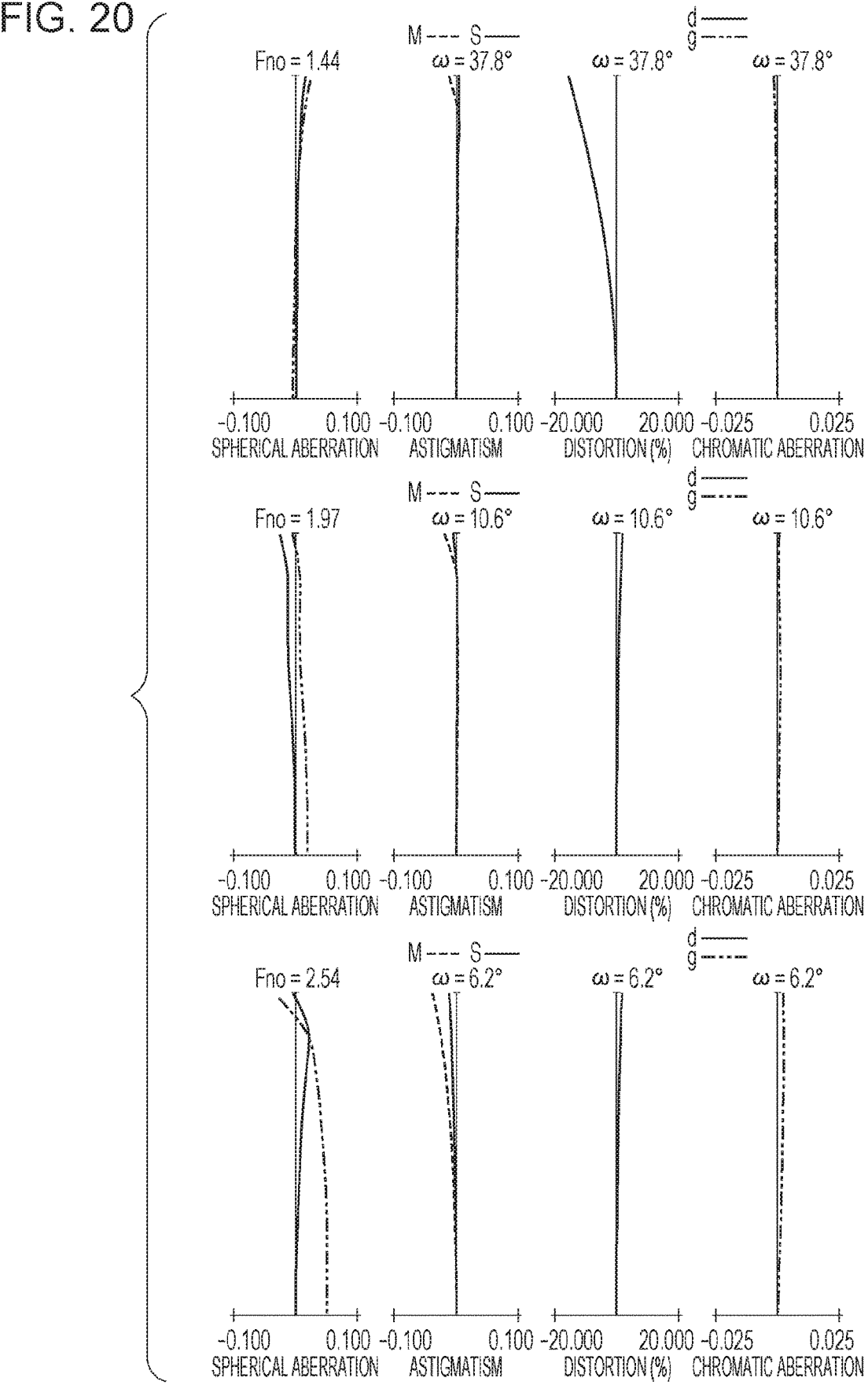
FIG. 20 provides aberration charts of the zoom lens according to Embodiment 10.
Figure 21:
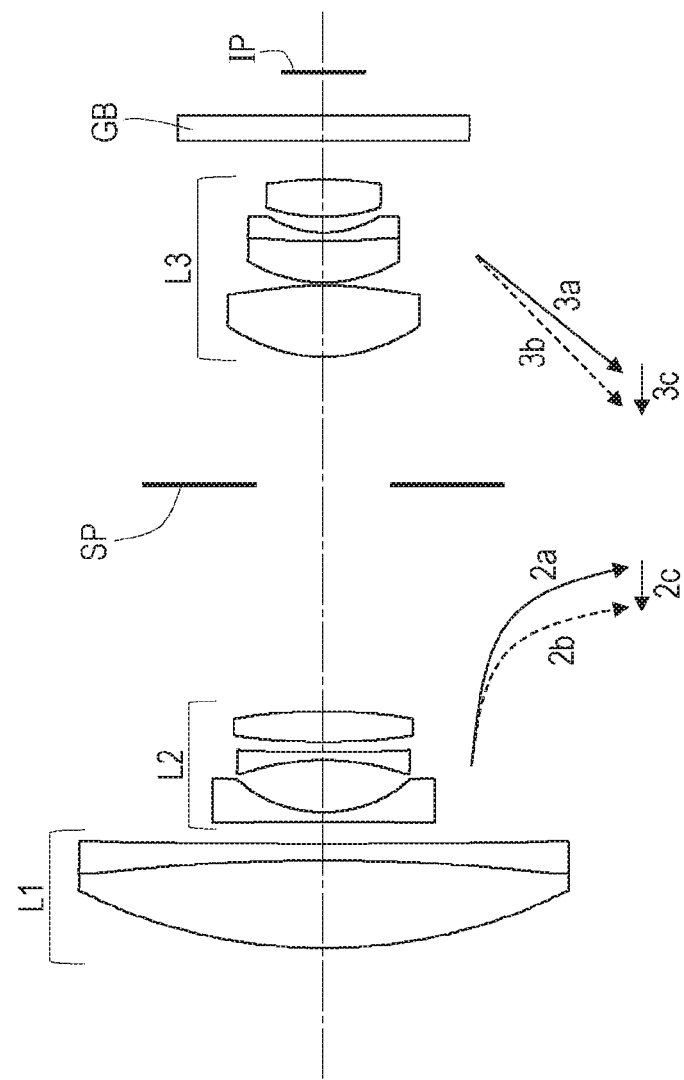
FIG. 21 is a sectional view of a zoom lens according to Embodiment 11.
Figure 22:
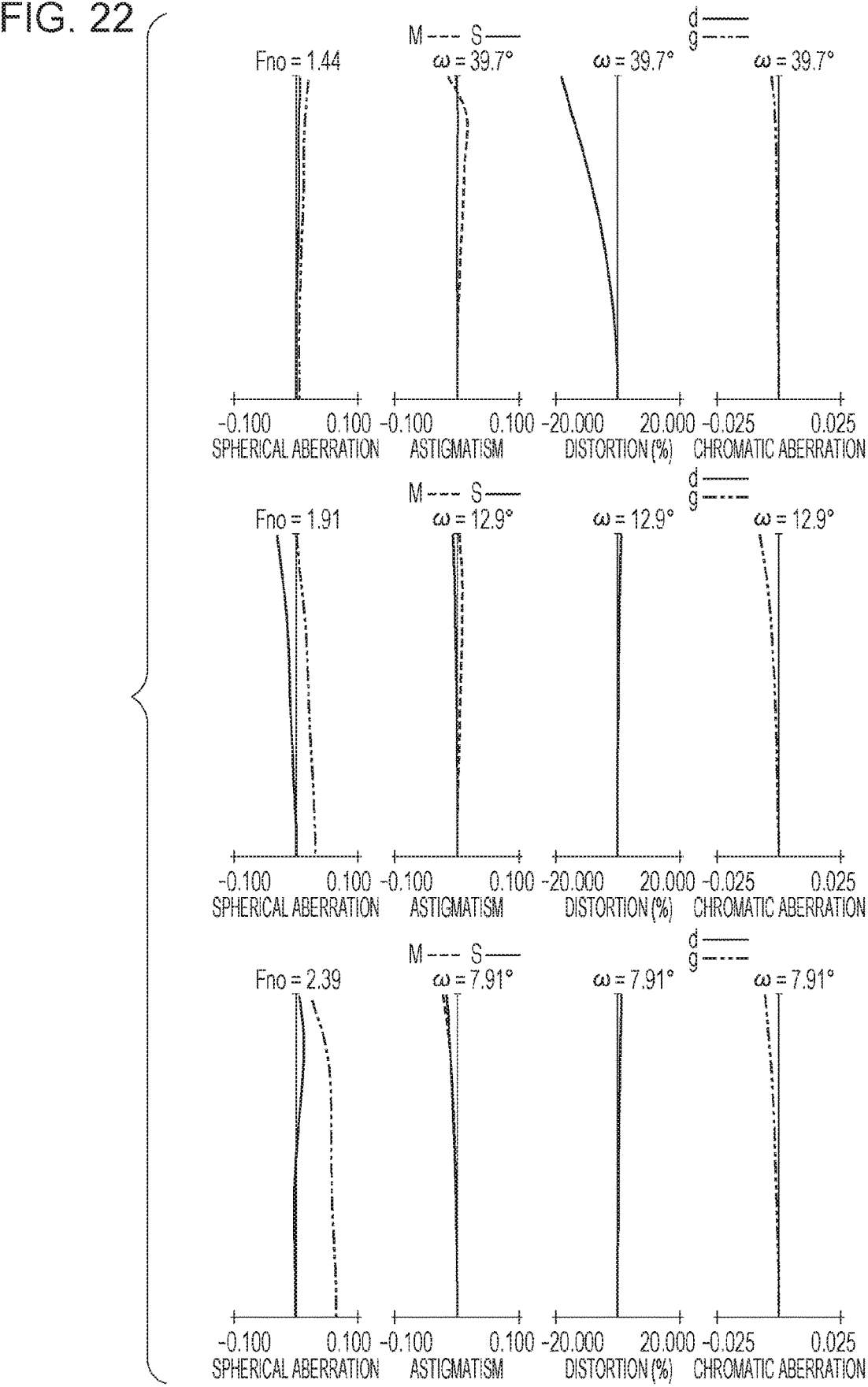
FIG. 22 provides aberration charts of the zoom lens according to Embodiment 11.

FIG. 19 is a sectional view of a zoom lens according to Embodiment 10. FIG. 20 provides aberration charts of the zoom lens according to Embodiment 10. The zoom lens according to Embodiment 10 has a zoom ratio of 5.92, and an F-number of about 1.44 to 2.54. FIG. 21 is a sectional view of a zoom lens according to Embodiment 11. FIG. 22 provides aberration charts of the zoom lens according to Embodiment 11. The zoom lens according to Embodiment 11 has a zoom ratio of 4.83, and an F-number of about 1.44 to 2.39.

Figure 23:
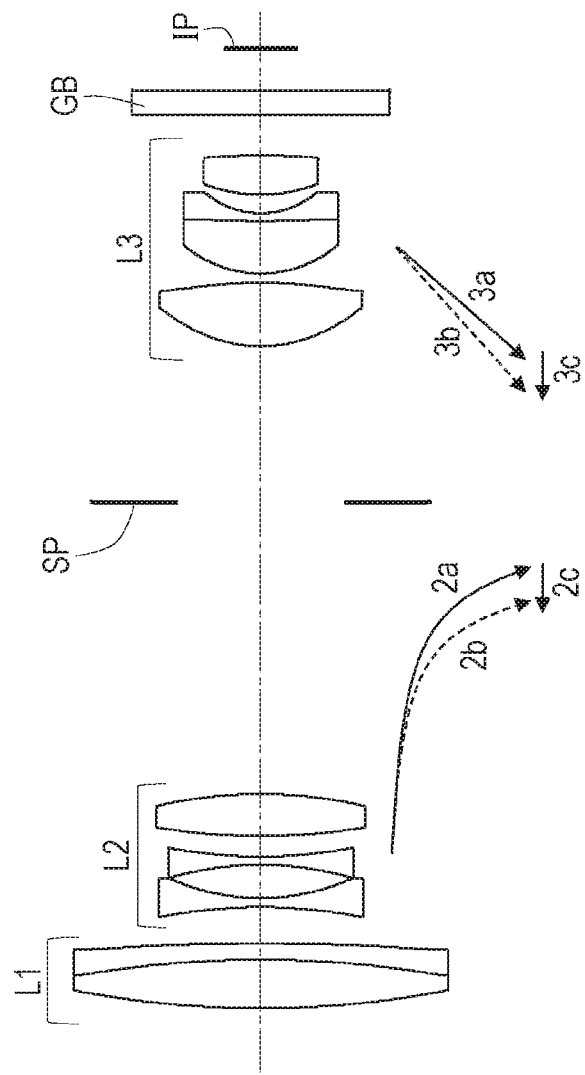
FIG. 23 is a sectional view of a zoom lens according to Embodiment 12.
Figure 24:
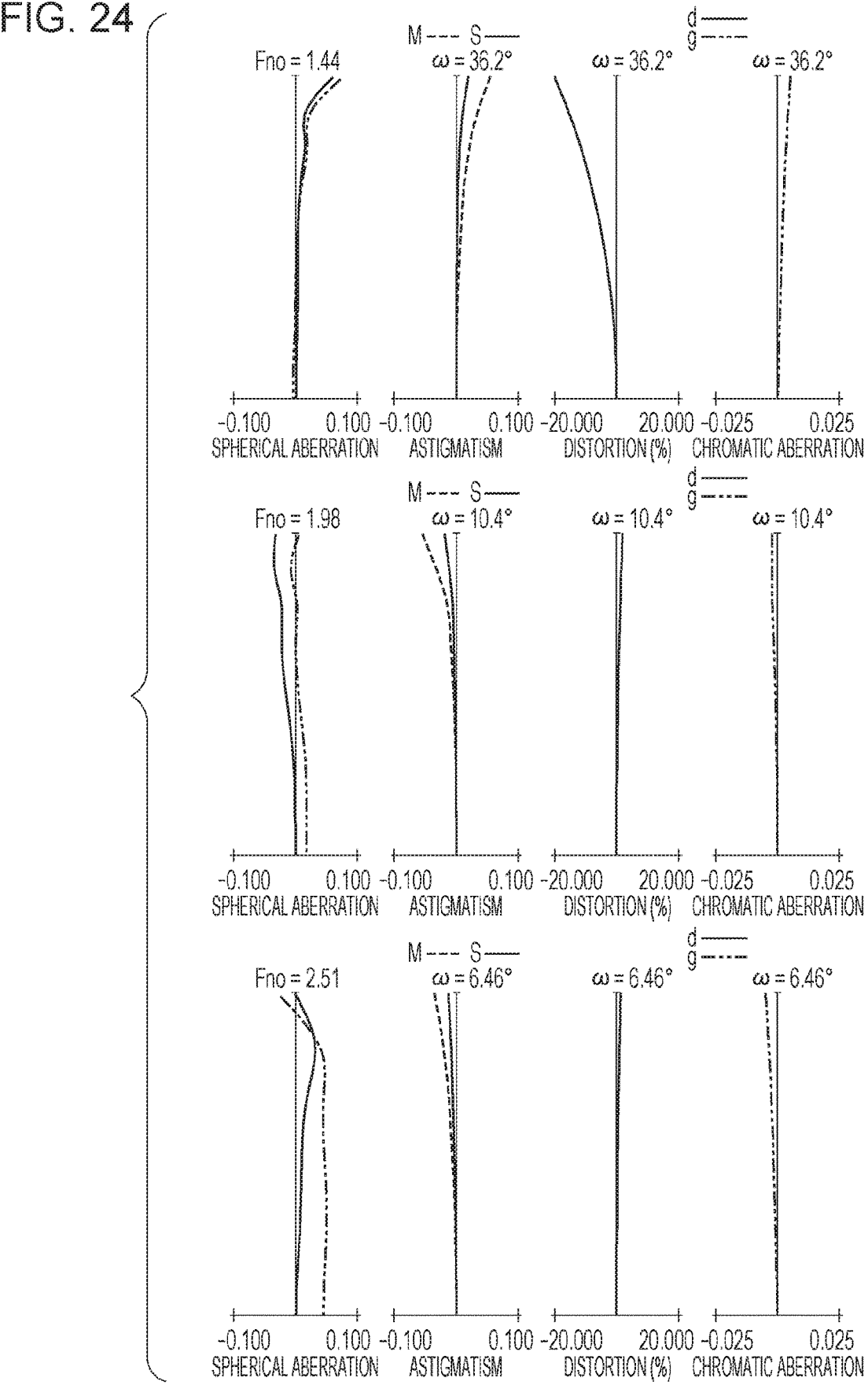
FIG. 24 provides aberration charts of the zoom lens according to Embodiment 12.

FIG. 23 is a sectional view of a zoom lens according to Embodiment 12. FIG. 24 provides aberration charts of the zoom lens according to Embodiment 12. The zoom lens according to Embodiment 12 has a zoom ratio of 5.12, and an F-number of about 1.44 to 2.51.

Figure 25:
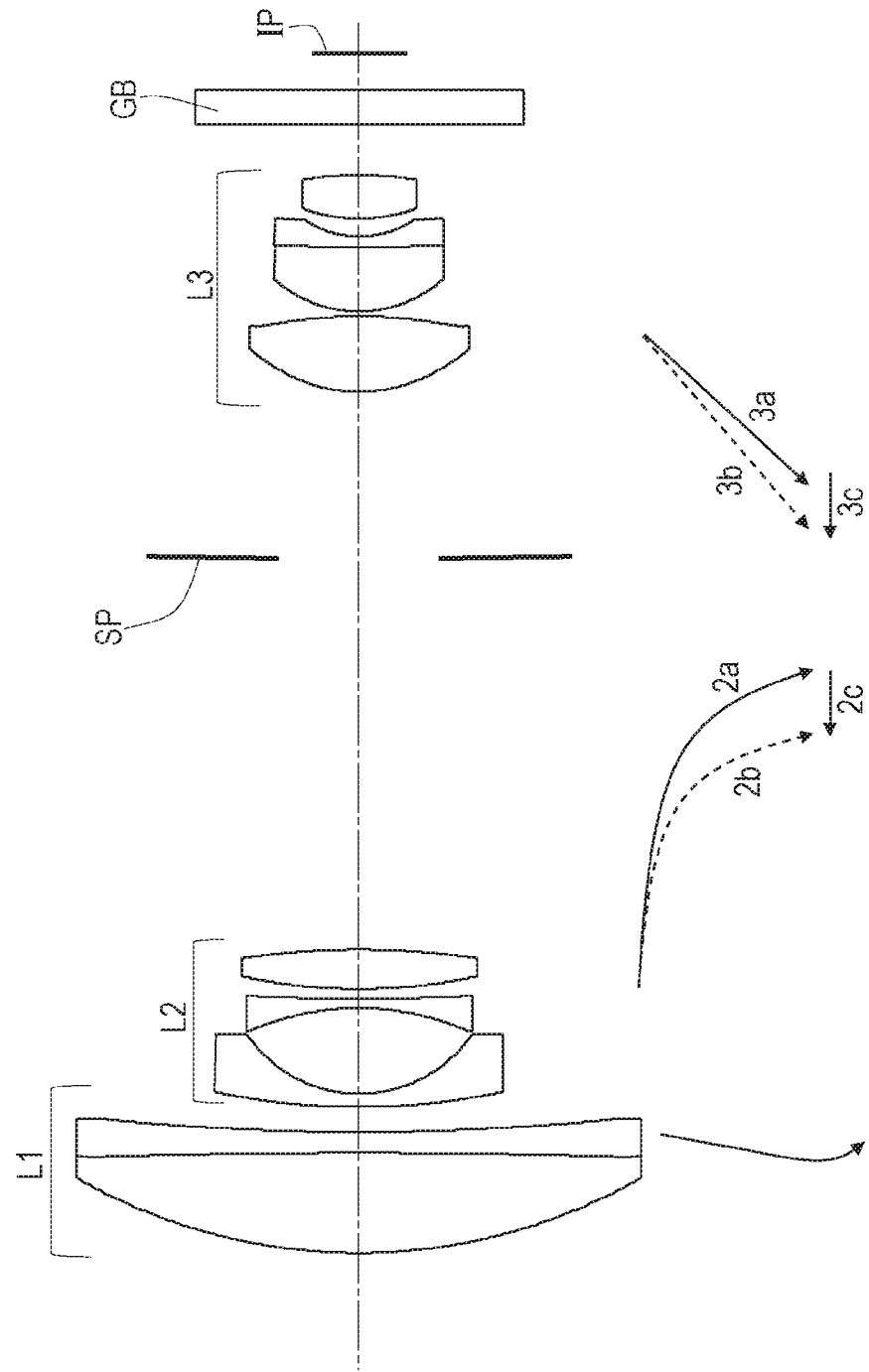
FIG. 25 is a sectional view of a zoom lens according to Embodiment 13.
Figure 26:
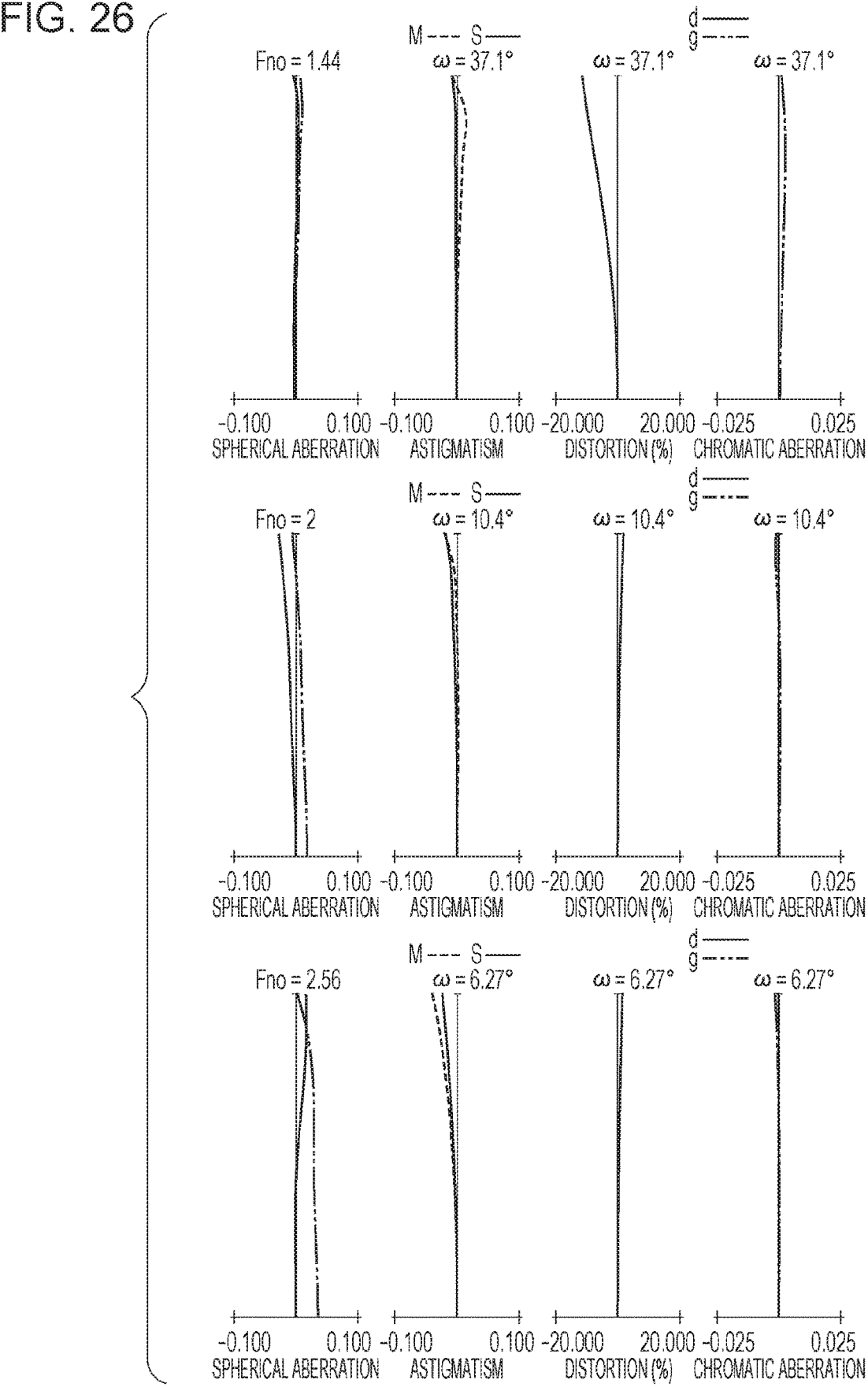
FIG. 26 provides aberration charts of the zoom lens according to Embodiment 13.

FIG. 25 is a sectional view of a zoom lens according to Embodiment 13. FIG. 26 provides aberration charts of the zoom lens according to Embodiment 13. The zoom lens according to Embodiment 13 has a zoom ratio of 6.00, and an F-number of about 1.44 to 2.56.

Figure 27:
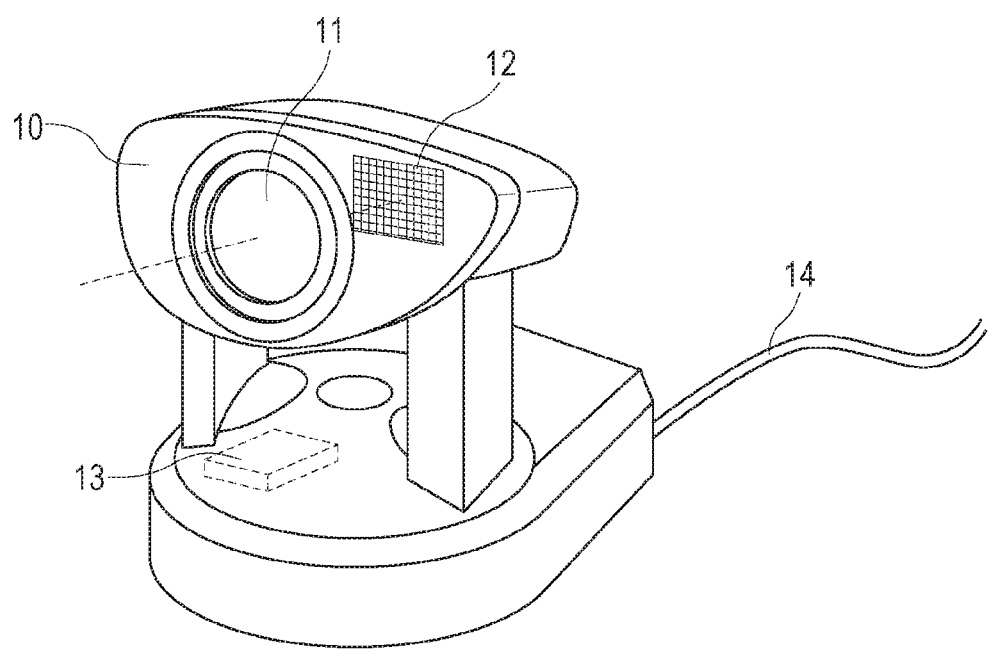
FIG. 27 is a schematic view illustrating a primary part of an image pickup apparatus including the zoom lens according to any of Embodiments 1 to 13.

FIG. 27 is a schematic view illustrating a primary part of a monitoring camera (image pickup apparatus) including any of the zoom lenses according to Embodiments 1 to 13 of the present invention. The zoom lens according to any of the respective embodiments is an image pickup lens system used for an image pickup apparatus such as a digital still camera, a video camera, a monitoring camera, or a broadcast camera. In each of the sectional views of the zoom lenses, the left side corresponds to an object side, and the right side corresponds to an image side. Assuming that "i" denotes the ordinal position of a lens unit from the object side to the image side in each of the sectional views, "Li" denotes the i-th lens unit.

In each of the embodiments, an aperture stop is denoted as SP. In each of the embodiments, the aperture stop SP is provided between a second lens unit L2 and a third lens unit L3. In each of the embodiments, the aperture stop SP does not move during zooming. This simplifies the structure of a lens barrel that holds the zoom lens.

An optical block GB corresponds to any of an optical filter, a face plate, a low-pass filter, an infrared cut-off filter, and the like. An image plane is denoted as IP. If the zoom lens is used as an image pickup optical system of a video camera or a monitoring camera, the image plane IP corresponds to a solid-state image pickup device (photoelectric conversion device), such as a charge-coupled-device (CCD) sensor or a complementary-metal-oxide-semiconductor (CMOS) sensor. If the zoom lens is used as an image pickup optical system of a silver-halide-film camera, the image plane IP corresponds to a film surface.

In each of the spherical aberration charts, Fno denotes the F-number, and shows spherical aberration for a d-line (at a wavelength of 587.6 nm) and spherical aberration for a g-line (at a wavelength of 435.8 nm). In each of the astigmatism charts, S denotes the sagittal image plane and M denotes the meridional image plane. Distortion is for the d-line. Each of the lateral-chromatic-aberration charts shows chromatic aberration for the g-line. Also, ω denotes the half angle of view of a picked-up image.

In each of the respective embodiments, the lens units move during zooming from the wide-angle end to the telephoto end, and a distance between adjacent ones of the lens units changes as represented by arrows illustrated in each of the sectional views. More specifically, in each of the zoom lenses according to the respective embodiments, a first lens unit L1 does not move during zooming from the wide-angle end to the telephoto end. A second lens unit L2 moves toward the image side during zooming from the wide-angle end to the telephoto end. A third lens unit L3 moves toward the object side.

Also, in each of the zoom lenses according to Embodiments 1 and 2, the second lens unit L2 serves as a focusing unit. To change the focus from an object at infinity to a near object at the telephoto end, the second lens unit L2 is moved toward the object side as represented by an arrow 2c illustrated in a corresponding one of the sectional views. A solid-line arrow 2a and a dotted-line arrow 2b illustrated in each of the sectional views represent movement loci for correcting variation in the image plane that may occur during zooming from the wide-angle end to the telephoto end when the focus is on the object at infinity and on the near object, respectively.

In the zoom lens according to any of Embodiment 3 to Embodiment 13, the second lens unit L2 and the third lens unit L3 serve as a focusing unit. To change the focus from an object at infinity to a near object at the telephoto end, the second lens unit L2 and the third lens unit L3 are moved toward the object side as represented by arrows 2c and 3c illustrated in a corresponding one of the sectional views. A solid-line arrow 2a and a solid-line arrow 3a illustrated in each of the sectional views represent movement loci for correcting variation in the image plane that may occur during zooming from the wide-angle end to the telephoto end when the focus is on the object at infinity. A dotted-line arrow 2b and a dotted-line arrow 3b illustrated in each of the sectional views represent movement loci for correcting variation in the image plane that may occur during zooming from the wide-angle end to the telephoto end when the focus is on the near object.

By moving a plurality of lens units during focusing, the moving amount of each lens unit during focusing can be decreased. As a result, variation in aberration during focusing can be effectively decreased.

In the zoom lens according to any of the respective embodiments, image blur can be corrected by moving a certain lens unit or a certain lens so as to have a component in a direction perpendicular to the optical axis thereof.

In the zoom lens according to any of Embodiments 1 to 6, conditional expressions are satisfied as follows:

$$0.05 < |f2/m2| < 0.59, \quad (1), \text{ and}$$

$$0.20 < |f3/m3| < 1.95, \quad (2).$$

In the conditional expressions, f2 is a focal length of the second lens unit L2, f3 is a focal length of the third lens unit L3, m2 is a moving amount of the second lens unit L2 during zooming from the wide-angle end to the telephoto end, and m3 is a moving amount of the third lens unit L3 during zooming from the wide-angle end to the telephoto end. A moving amount indicates a difference in position of each lens unit on the optical axis between the position at the wide-angle end and the position at the telephoto end.

Conditional Expression (1) defines a ratio of the focal length f2 of the second lens unit L2 to the moving amount m2 of the second lens unit L2 during zooming from the wide-angle end to the telephoto end. If the focal length f2 of the second lens unit L2 is decreased and the ratio becomes smaller than the lower limit value of Conditional Expression (1), the refractive power of the second lens unit L2 becomes excessively strong. As a result, variation in lateral chromatic aberration is increased during zooming and hence this is not desirable. If the focal length f2 of the second lens unit L2 is increased and the ratio becomes larger than the upper limit value of Conditional Expression (1), the refractive power of the second lens unit L2 becomes excessively weak. As a result, it is difficult to sufficiently increase the zoom ratio and hence this is not desirable.

Conditional Expression (2) defines a ratio of the focal length f3 of the third lens unit L3 to the moving amount m3 of the third lens unit L3 during zooming from the wide-angle end to the telephoto end. If the focal length f3 of the third lens unit L3 is decreased and the ratio becomes smaller than the lower limit value of Conditional Expression (2), the refractive power of the third lens unit L3 becomes excessively strong. As a result, variation in field curvature is increased during zooming, and hence this is not desirable. If the focal length f3 of the third lens unit L3 is increased and the ratio becomes larger than the upper limit value of Conditional Expression (2), the refractive power of the third lens unit L3 becomes excessively weak. As a result, it is difficult to sufficiently increase the zoom ratio and to appropriately correct lateral chromatic aberration, and hence this is not desirable.

As described above, in Embodiments 1 to 6, elements are appropriately set so that Conditional Expressions (1) and (2) are satisfied. Accordingly, a zoom lens, the entire system of the zoom lens being small, having a high zoom ratio, and having high optical performance in the entire zoom range, can be obtained.

In any of Embodiments 1 to 6, the numerical ranges of Conditional Expressions (1) and (2) may be preferably set as follows:

$$0.25 < |f2/m2| < 0.57 \quad (1a), \text{ and}$$

$$0.55 < |f3/m3| < 1.90 \quad (2a).$$

The numerical ranges of Conditional Expressions (1) and (2) may be more preferably set as follows:

$$0.45 < |f2/m2| < 0.55 \quad (1b), \text{ and}$$

$$0.90 < |f3/m3| < 1.85 \quad (2b).$$

Further, in any of Embodiments 1 to 6, at least one of the following conditional expressions may be further preferably satisfied:

$$0.40 < |f2/f3| < 1.20 \quad (3),$$

$$4.00 < |f1/f2| < 20.00 \quad (4),$$

$$1.70 < nd2n < 2.30 \quad (5),$$

$$60.00 < vd3p < 98.00 \quad (6), \text{ and}$$

$$0.030 < d23t/TLt < 0.100 \quad (7).$$

In the conditional expressions, f1 is a focal length of the first lens unit L1, nd2n is an average value of refractive indices of materials of negative lenses included in the second lens unit L2, and vd3p is an Abbe number of a material with the largest Abbe number among Abbe numbers of materials of positive lenses included in the third lens unit L3. Further, d23t is a distance on the optical axis between the second lens unit L2 and the third lens unit L3 at the telephoto end, and TLt is a total length of the zoom lens at the telephoto end.

Conditional Expression (3) defines a ratio of the focal length f2 of the second lens unit L2 to the focal length f3 of the third lens unit L3. If the focal length f3 of the third lens unit L3 is increased and the ratio becomes smaller than the lower limit value of Conditional Expression (3), the refractive power of the third lens unit L3 becomes excessively weak. As a result, the moving amount of the third lens unit L3 is increased during zooming and it is difficult to sufficiently reduce the size of the zoom lens. Hence this is not desirable. If the focal length f3 of the third lens unit L3 is decreased and the ratio becomes larger than the upper limit value of Conditional Expression (3), the refractive power of the third lens unit L3 becomes excessively strong. As a result, spherical aberration is generated by a large amount, and hence this is not desirable.

Conditional Expression (4) defines a ratio of the focal length f1 of the first lens unit L1 to the focal length f2 of the second lens unit L2. If the focal length f1 of the first lens unit L1 is decreased and the ratio becomes smaller than the lower limit value of Conditional Expression (4), the refractive power of the first lens unit L1 becomes excessively strong. As a result, longitudinal chromatic aberration is excessively corrected, and hence this is not desirable. If the focal length f1 of the first lens unit L1 is increased and the ratio becomes larger than the upper limit value of Conditional Expression (4), the refractive power of the first lens unit L1 becomes excessively weak. As a result, it is difficult to sufficiently correct longitudinal chromatic aberration, and hence this is not desirable.

Conditional Expression (5) defines the average value nd2n of the refractive indices of the materials of the negative lenses included in the second lens unit L2. If the average value nd2n becomes smaller than the lower limit value of Conditional Expression (5), it is required to decrease the curvature radius of each lens surface of the second lens unit L2 for holding the negative refractive power of the second lens unit L2. As a result, spherical aberration and coma aberration are excessively corrected at the telephoto end, and hence this is not desirable. If the average value nd2n becomes larger than the upper limit value of Conditional Expression (5), it is required to increase the curvature radius of each lens surface of the second lens unit L2 to cause the negative refractive power of the second lens unit L2 to fall within an appropriate range. As a result, it is difficult to sufficiently correct spherical aberration and coma aberration at the telephoto end, and hence this is not desirable.

Conditional Expression (6) defines the Abbe number vd3p of a material having the largest Abbe number among the Abbe numbers of the materials of the positive lenses included in the third lens unit L3. If the Abbe number vd3p is smaller than the lower limit value, it is difficult to sufficiently correct lateral chromatic aberration, and hence this is not desirable. If the Abbe number vd3p is larger than the upper limit value, lateral chromatic aberration is excessively corrected, and hence this is not desirable.

Conditional Expression (7) defines a ratio of the distance d23t on the optical axis between the second lens unit L2 and the third lens unit L3 at the telephoto end to the total length TLt of the zoom lens at the telephoto end. If the distance d23t on the optical axis between the second lens unit L2 and the third lens unit L3 at the telephoto end is decreased, and the ratio becomes smaller than the lower limit value of Conditional Expression (7), it is difficult to sufficiently ensure the space for arranging the aperture stop SP, and hence this is not desirable. If the distance d23t on the optical axis between the second lens unit L2 and the third lens unit L3 at the telephoto end is increased, and the ratio becomes larger than the upper limit value of Conditional Expression (7), it is difficult to sufficiently ensure the moving amounts of the second lens unit L2 and the third lens unit L3 during zooming, and hence this is not desirable. As a result, it is difficult to sufficiently increase the zoom ratio and hence this is not desirable.

Preferably, the numerical ranges of Conditional Expressions (3) to (7) may be set as follows:

$$0.50 < |f2/f3| < 1.00 \quad (3a),$$

$$4.50 < |f1/f2| < 12.00 \quad (4a),$$

$$1.75 < nd2n < 2.20 \quad (5a),$$

$$65.00 < vd3p < 93.00 \quad (6a), \text{ and}$$

$$0.040 < d23t/TLt < 0.090 \quad (7a).$$

More preferably, the numerical ranges of Conditional Expressions (3) to (7) may be set as follows:

$$0.60 < |f2/f3| < 0.80 \quad (3b),$$

$$5.00 < |f1/f2| < 9.00 \quad (4b),$$

$$1.80 < nd2n < 2.10 \quad (5b),$$

$$70.00 < vd3p < 88.00 \quad (6b), \text{ and}$$

$$0.050 < d23t/TLt < 0.080 \quad (7b).$$

In the zoom lens according to any of Embodiments 1 to 3 and 7 to 12, a conditional expression is satisfied as follows:

$$7.00 < f1/fw < 30.00 \quad (8).$$

In this conditional expression, f1 is a focal length of the first lens unit L1, and fw is a focal length of the zoom lens at the wide-angle end.

Conditional Expression (8) defines a ratio of the focal length f1 of the first lens unit L1 to the focal length fw of the zoom lens at the wide-angle end. To increase the zoom ratio, it is effective to increase the refractive power of the first lens unit L1. In the zoom lens according to any of Embodiments 1 to 3 and 7 to 12, a certain positive refractive power is applied to the first lens unit L1.

If the focal length f1 of the first lens unit L1 is decreased and the ratio becomes smaller than the lower limit value of Conditional Expression (8), the refractive power of the first lens unit L1 becomes excessively strong. As a result, field curvature and coma aberration at the telephoto end are generated by large amounts, and hence this is not desirable. If the focal length f1 of the first lens unit L1 is increased and the ratio becomes larger than the upper limit value of Conditional Expression (8), the refractive power of the first lens unit L1 becomes excessively weak. As a result, it is difficult to sufficiently increase the zoom ratio of the zoom lens, and hence this is not desirable.

Also, the first lens unit L1 includes, in order from the object side to the image side, a positive lens and a negative lens. By arranging the positive lens and the negative lens in the first lens unit L1, chromatic aberration is appropriately corrected. In particular, by arranging the positive lens on the most object side of the first lens unit and arranging the negative lens on the image side of the positive lens, the incident angle of an off-axis ray on the negative lens can be increased. Accordingly, lateral chromatic aberration can be appropriately corrected.

In the zoom lens according to any of Embodiments 1 to 3 and 7 to 12, the first lens unit L1 includes the single positive lens and the single negative lens. The zoom lens can effectively correct chromatic aberration without increasing the number of lenses. Accordingly, reduction in size of the zoom lens and correction of chromatic aberration can be both attained.

As described in Embodiments 1 to 3 and 7 to 12, the structure of the first lens unit L1 is appropriately set so that Conditional Expression (8) is satisfied. Accordingly, a zoom lens, the entire system of the zoom lens being small, having a high zoom ratio, and having high optical performance in the entire zoom range, can be obtained.

In any of Embodiments 1 to 3 and 7 to 12, the numerical ranges of Conditional Expression (8) may be preferably set as follows:

$$8.00 < f1/fw < 25.00 \quad (8a).$$

The numerical ranges of Conditional Expression (8) may be more preferably set as follows:

$$10.00 < f1/fw < 20.00 \quad (8b).$$

Further, in any of Embodiments 1 to 3 and 7 to 12, at least one of the following conditional expressions may be further preferably satisfied:

$$2.00 < f1/L12t < 5.00 \quad (9),$$

$$1.75 < (Ndp+Ndn)/2 < 2.30 \quad (10), \text{ and}$$

$$-1.00 < (r1+r2)/(r1-r2) < 0.50 \quad (11).$$

In the conditional expressions, f2 is a focal length of the second lens unit L2, L12t is a length from a lens surface vertex on the most image side of the first lens unit L1 to a lens surface vertex on the most object side of the second lens unit L2 at the telephoto end, and Ndp is a refractive index of the positive lens included in the first lens unit L1 for the d-line. Further, Ndn is a refractive index of the negative lens included in the first lens unit L1 for the d-line, r1 is a curvature radius of a lens surface on the object side of the positive lens included in the first lens unit L1, and r2 is a curvature radius of a lens surface on the image side.

Conditional Expression (9) defines a ratio of the focal length f1 of the first lens unit L1 to the length L12t from the lens surface vertex on the most image side of the first lens unit L1 to the lens surface vertex on the most object side of the second lens unit L2 at the telephoto end. If the focal length f1 of the first lens unit L1 is decreased and the ratio becomes smaller than the lower limit value of Conditional Expression (9), the refractive power of the first lens unit L1 becomes excessively strong. As a result, longitudinal chromatic aberration is excessively corrected, and hence this is not desirable. If the focal length f1 of the first lens unit L1 is increased and the ratio becomes larger than the upper limit value of Conditional Expression (9), the refractive power of the first lens unit L1 becomes excessively weak. As a result, it is difficult to sufficiently increase the zoom ratio of the zoom lens, and hence this is not desirable.

Conditional Expression (10) defines a refractive index of a material of a lens included in the first lens unit L1. If the refractive index becomes smaller than the lower limit value of Conditional Expression (10), it is required to decrease the curvature radius of each lens surface of the positive lens included in the first lens unit L1 for holding the positive refractive power of the first lens unit L1. As a result, spherical aberration and coma aberration at the telephoto end are generated by large amounts, and hence this is not desirable. If the refractive index is larger than the upper limit value of Conditional Expression (10), it is required to increase the curvature radius of each lens surface of the positive lens included in the first lens unit L1 for causing the positive refractive power of the first lens unit L1 to fall within an appropriate range. As a result, field curvature and coma aberration at the telephoto end are generated by large amounts, and hence this is not desirable.

Conditional Expression (11) defines a shape of the positive lens included in the first lens unit L1. If the shape is smaller than the lower limit value of Conditional Expression (11), a paraxial curvature radius of a lens surface on the image side of the positive lens included in the first lens unit L1 is excessively large. As a result, it is difficult to appropriately correct lateral chromatic aberration at the wide-angle end, and hence this is not desirable. If the shape is larger than the upper limit value of Conditional Expression (11), the paraxial curvature radius of the lens surface on the image side of the positive lens included in the first lens unit L1 is excessively small. As a result, lateral chromatic aberration at the wide-angle end is excessively corrected, and hence this is not desirable.

The numerical ranges of Conditional Expressions (8) to (11) may be preferably set as follows:

$$2.30 < f1/L12t < 4.50 \quad (9a),$$

$$1.80 < (Ndp+Ndn)/2 < 2.10 \quad (10a), \text{ and}$$

$$-0.90 < (r1+r2)/(r1-r2) < 0.10 \quad (11a).$$

The numerical ranges of Conditional Expressions (8) to (11) may be more preferably set as follows:

$$2.50 < f1/L12t < 4.00 \quad (9b),$$

$$1.86 < (Ndp+Ndn)/2 < 1.90 \quad (10b), \text{ and}$$

$$-0.83 < (r1+r2)/(r1-r2) < -0.02 \quad (11b).$$

In the zoom lens according to any of Embodiments 1 to 3 and 7 to 13, a negative lens is arranged on the most object side of the second lens unit L2. When R1 is a curvature radius of a lens surface on the object side of the negative lens, R2 is a curvature radius of a lens surface on the image side of the negative lens, and nd2n is a refractive index of a material of the negative lens for the d-line, conditional expressions are satisfied as follows:

$$1.91 < nd2n < 2.40 \quad (12), \text{ and}$$

$$-1.50 < (R2+R1)/(R2-R1) < -0.10 \quad (13).$$

Conditional Expression (12) defines the refractive index nd2n of the material of the negative lens included in the second lens unit L2 and arranged on the most object side. If the refractive index nd2n is smaller than the lower limit value of Conditional Expression (12), the refractive index of the material of the negative lens is excessively low, and it is difficult to sufficiently increase the refractive power of the second lens unit L2. As a result, it is difficult to sufficiently increase the zoom ratio of the whole zoom lens system, and hence this is not desirable. A material having a refractive index larger than the upper limit value of Conditional Expression (12) has a very small Abbe number. If such a material is used for the negative lens included in the second lens unit L2, it is difficult to appropriately correct chromatic aberration in the second lens unit L2.

Conditional Expression (13) defines a shape of the negative lens. If the value representing the shape of Conditional Expression (13) is 0, the lens is a biconcave lens in which a paraxial curvature radius of a lens surface on the object side is equivalent to a paraxial curvature radius of a lens surface on the image side. If the value of Conditional Expression (13) is −1, the lens is a plano-concave lens having a substantially flat lens surface on the object side.

If the value representing the shape is smaller than the lower limit value of Conditional Expression (13), the shape of the negative lens is a meniscus shape with a convex surface thereof facing the object side, the refractive power of the convex surface on the object side is excessively strong, and it is difficult to sufficiently increase the negative refractive power of the negative lens. As a result, it is difficult to sufficiently increase the refractive power of the second lens unit L2, and difficult to sufficiently increase the zoom ratio of the whole zoom lens system. Hence this is not desirable. If the value representing the shape is larger than the upper limit value of Conditional Expression (13), the negative refractive power of the negative lens is excessively strong.

As a result, distortion aberration and field curvature are generated by large amounts in the second lens unit L2, and hence this is not desirable.

As described in Embodiments 1 to 3 and 7 to 13, elements are appropriately set so that Conditional Expressions (12) and (13) are satisfied. Accordingly, a zoom lens, the entire system of the zoom lens being small, having a high zoom ratio, and having high optical performance in the entire zoom range, can be obtained.

In any of Embodiments 1 to 3 and 7 to 13, the numerical ranges of Conditional Expressions (12) and (13) may be preferably set as follows:

$$1.92 < nd2n < 2.12 \quad (12a), \text{ and}$$

$$-1.49 < (R2+R1)/(R2-R1) < -0.30 \quad (13a).$$

The numerical ranges of Conditional Expressions (12) and (13) may be more preferably set as follows:

$$1.94 < nd2n < 2.08 \quad (12b), \text{ and}$$

$$-1.48 < (R2+R1)/(R2-R1) < -0.40 \quad (13b).$$

Further, in any of Embodiments 1 to 3 and 7 to 13, at least one of the following conditional expressions may be further preferably satisfied:

$$1.00 < |f2/fw| < 4.00 \quad (14),$$

$$1.50 < f3/fw < 5.00 \quad (15), \text{ and}$$

$$7.00 < f1/fw < 30.00 \quad (16).$$

In this conditional expressions, f1 is a focal length of the first lens unit L1, f2 is a focal length of the second lens unit L2, f3 is a focal length of the third lens unit L3, and fw is a focal length of the zoom lens at the wide-angle end.

Conditional Expression (14) defines a ratio of the focal length f2 of the second lens unit L2 to the focal length fw of the zoom lens at the wide-angle end. If the focal length f2 of the second lens unit L2 is decreased and the ratio becomes smaller than the lower limit value of Conditional Expression (14), the refractive power of the second lens unit L2 becomes excessively strong. As a result, variation in field curvature and lateral chromatic aberration is increased during zooming, and hence this is not desirable. If the focal length f2 of the second lens unit L2 is increased and the ratio becomes larger than the upper limit value of Conditional Expression (14), the refractive power of the second lens unit L2 becomes excessively weak. As a result, the moving amount of the second lens unit L2 is increased during zooming and it is difficult to sufficiently reduce the size of the zoom lens. Hence this is not desirable.

Conditional Expression (15) defines a ratio of the focal length f3 of the third lens unit L3 to the focal length fw of the zoom lens at the wide-angle end. If the focal length f3 of the third lens unit L3 is decreased and the ratio becomes smaller than the lower limit value of Conditional Expression (15), the refractive power of the third lens unit L3 becomes excessively strong. As a result, variation in field curvature is increased during zooming, and hence this is not desirable. If the focal length f3 of the third lens unit L3 is increased and the ratio becomes larger than the upper limit value of Conditional Expression (15), the refractive power of the third lens unit L3 becomes excessively weak. As a result, the moving amount of the third lens unit L3 is increased during zooming and it is difficult to sufficiently reduce the size of the zoom lens. Hence this is not desirable.

Conditional Expression (16) defines a ratio of the focal length f1 of the first lens unit L1 to the focal length fw of the zoom lens at the wide-angle end. If the focal length f1 of the first lens unit L1 is decreased and the ratio becomes smaller than the lower limit value of Conditional Expression (16), the refractive power of the first lens unit L1 becomes excessively strong. As a result, it is difficult to appropriately correct spherical aberration and coma aberration at the telephoto end, and hence this is not desirable. If the focal length f1 of the first lens unit L1 is increased and the ratio becomes larger than the upper limit value of Conditional Expression (16), the refractive power of the first lens unit L1 becomes excessively weak. As a result, it is difficult to appropriately correct longitudinal chromatic aberration, and hence this is not desirable.

The numerical ranges of Conditional Expressions (14) to (16) may be preferably set as follows:

$$1.50 < |f2/fw| < 3.00 \quad (14a),$$

$$2.00 < f3/fw < 4.00 \quad (15a), \text{ and}$$

$$9.00 < f1/fw < 25.00 \quad (16a).$$

The numerical ranges of Conditional Expressions (14) to (16) may be more preferably set as follows:

$$1.90 < |f2/fw| < 2.40 \quad (14b),$$

$$2.80 < f3/fw < 3.50 \quad (15b), \text{ and}$$

$$10.0 < f1/fw < 20.00 \quad (16b).$$

Embodiments 7 to 13 may desirably satisfy Conditional Expression (4) like Embodiments 1 to 6.

Structures of lens units are described next. In the zoom lens according to each of the embodiments, the first lens unit L1 includes a cemented lens in which a positive lens and a negative lens are cemented. The negative lens included in the first lens unit is arranged adjacently to the image side of the positive lens. The cemented surface of the cemented lens has a shape with a convex surface thereof facing the image side. Accordingly, the incident angle of an off-axis ray on the negative lens can be increased, and as a result, lateral chromatic aberration can be appropriately corrected.

Also, in the zoom lens according to any of Embodiments 1, and 3 to 13, the second lens unit L2 includes, in order from the object side to the image side, a negative lens, a negative lens, and a positive lens. In the zoom lens according to Embodiment 2, the second lens unit L2 includes, in order from the object side to the image side, a negative lens, a negative lens, and a cemented lens in which a positive lens and a negative lens are cemented. By arranging at least two negative lenses in the second lens unit L2 and distributing the negative refractive power to the plurality of negative lenses, the refractive power of each negative lens can be decreased. As a result, occurrence of spherical aberration and coma aberration at the telephoto end can be decreased. By arranging the positive lens in addition to the two negative lenses in the second lens unit L2, chromatic aberration can be appropriately corrected.

In the zoom lens according to any of Embodiments 1, and 3 to 13, the third lens unit L3 includes, in order from the object side to the image side, a positive lens, a cemented lens in which a positive lens and a negative lens are cemented, and a positive lens. In the zoom lens according to Embodiment 2, the third lens unit L3 includes, in order from the object side to the image side, a positive lens, a negative lens, and a positive lens.

Lens data according to Numerical Examples 1 to 13 respectively corresponding to Embodiments 1 to 13 of the present invention is given below. In each of Numerical Examples 1 to 13, i denotes the ordinal position of an optical surface from the object side. ri denotes the curvature radius of the i-th optical surface (the i-th surface), di denotes the distance between the i-th surface and the i+1-th surface, and ndi and vdi denote the refractive index and the Abbe number, respectively, of the material forming the i-th optical member for the d-line.

Letting the eccentricity be K; the aspherical coefficients be A4, A6, A8, A10, and A12; and the displacement of the surface vertex in the optical-axis direction at a height h from the optical axis be x, the aspherical shape is expressed as follows:

$$x=(h^2/r)/[1+[1-(1+K)(h/r)^2]^{1/2}]+A4h^4+A6h^6+A8h^8+A10h^{10}+A12h^{12},$$

where R denotes the paraxial curvature radius. "e-Z" denotes "$10^{-Z}$."

In each of Numerical Examples 1 to 13, the back focal length (BF) corresponds to the length obtained through aerial conversion of the distance from the surface on the most image side of the lens system to the image plane. Table 1 shows correspondence to the above-described conditional expressions according to Numerical Examples 1 to 6. Tables 2 and 3 show correspondence to the above-described conditional expressions according to Numerical Examples 1 to 3, and 7 to 12. Tables 4 and 5 show correspondence to the above-described conditional expressions according to Numerical Examples 1 to 3, and 7 to 13.

Numerical Example 1

| Unit: mm | | | | |
|---|---|---|---|---|
| Data on surfaces | | | | |
| Surface No. | r | d | nd | vd |
| 1 | 20.341 | 3.81 | 1.77250 | 49.6 |
| 2 | −81.033 | 0.60 | 1.95906 | 17.5 |
| 3 | 494.995 | (variable) | | |
| 4 | −144.031 | 0.40 | 2.00100 | 29.1 |
| 5 | 4.864 | 2.20 | | |
| 6 | −14.518 | 0.35 | 1.77250 | 49.6 |
| 7 | 16.027 | 0.48 | | |
| 8 | 12.802 | 1.35 | 1.95906 | 17.5 |
| 9 | −59.102 | (variable) | | |
| 10 (stop) | ∞ | (variable) | | |
| 11* | 4.580 | 2.13 | 1.58313 | 59.4 |
| 12* | −16.321 | 0.15 | | |
| 13 | 5.039 | 1.72 | 1.49700 | 81.5 |
| 14 | 27.781 | 0.40 | 2.00069 | 25.5 |
| 15 | 3.260 | 0.47 | | |
| 16 | 6.829 | 1.19 | 1.69680 | 55.5 |
| 17 | −17.276 | (variable) | | |
| 18 | ∞ | 1.10 | 1.51000 | 60.0 |
| 19 | ∞ | 1.79 | | |
| Image plane | ∞ | | | |

Data on aspherical surfaces

11th surface

K = 0.00000e+000 A4 = −1.29709e−003 A6 = 1.32144e−005
A8 = −1.02709e−005 A10 = 6.43379e−007 A12 = −4.25073e−008

12th surface

K = 0.00000e+000 A4 = 4.56386e−004 A6 = 5.69296e−006
A8 = −5.33974e−006

| Unit: mm | | | |
|---|---|---|---|
| Other data | | | |
| Zoom ratio 5.35 | | | |
| | Wide-angle | Intermediate | Telephoto |
| Focal length | 2.25 | 7.12 | 12.04 |
| F-number | 1.44 | 2.01 | 2.58 |
| Half angle of view | 40.5 | 12.2 | 7.3 |
| Image height | 1.58 | 1.58 | 1.58 |
| Total lens length | 36.62 | 36.62 | 36.62 |
| BF | 4.30 | 6.27 | 8.23 |
| d 3 | 1.06 | 9.18 | 10.74 |
| d 9 | 11.09 | 2.97 | 1.40 |
| d10 | 4.94 | 2.97 | 1.00 |
| d17 | 1.77 | 3.74 | 5.71 |

Numerical Example 2

| Unit: mm | | | | |
|---|---|---|---|---|
| Data on surfaces | | | | |
| Surface No. | r | d | nd | vd |
| 1 | 17.479 | 4.06 | 1.77250 | 49.6 |
| 2 | −177.794 | 0.60 | 1.95906 | 17.5 |
| 3 | 122.910 | (variable) | | |
| 4 | 123.060 | 0.40 | 2.00100 | 29.1 |
| 5 | 4.450 | 2.54 | | |
| 6 | −12.523 | 0.35 | 1.91082 | 35.3 |
| 7 | 143.825 | 0.15 | | |
| 8 | 12.891 | 1.60 | 1.95906 | 17.5 |
| 9 | −21.209 | 0.40 | 1.83481 | 42.7 |
| 10 | 61.424 | (variable) | | |
| 11 (stop) | ∞ | (variable) | | |
| 12* | 4.293 | 2.05 | 1.76802 | 49.2 |
| 13* | −54.590 | 0.52 | | |
| 14 | 6.491 | 0.40 | 1.95906 | 17.5 |
| 15 | 3.232 | 0.75 | | |
| 16 | 8.442 | 1.31 | 1.48749 | 70.2 |
| 17 | −12.106 | (variable) | | |
| 18 | ∞ | 1.10 | 1.51000 | 60.0 |
| 19 | ∞ | 1.79 | | |
| Image plane | ∞ | | | |

Data on aspherical surfaces

12th surface

K = 0.00000e+000 A4 = −1.21833e−003 A6 = −1.82858e−005
A8 = −3.28373e−006 A10 = 1.59061e−007 A12 = −1.52620e−008

13th surface

K = 0.00000e+000 A4 = 7.27797e−004 A6 = −7.71658e−006
A8 = −5.59710e−007

| Other data | | | |
|---|---|---|---|
| Zoom ratio 5.36 | | | |
| | Wide-angle | Intermediate | Telephoto |
| Focal length | 2.25 | 7.38 | 12.05 |
| F-number | 1.44 | 2.01 | 2.58 |
| Half angle of view | 40.5 | 12.0 | 7.4 |
| Image height | 1.58 | 1.58 | 1.58 |
| Total lens length | 36.62 | 36.62 | 36.62 |
| BF | 5.13 | 7.38 | 9.64 |
| d 3 | 0.93 | 8.40 | 9.37 |
| d10 | 9.93 | 2.46 | 1.50 |
| d11 | 5.51 | 3.25 | 1.00 |
| d17 | 2.61 | 4.86 | 7.12 |

Numerical Example 3

Unit: mm

Data on surfaces

| Surface No. | r | d | nd | νd |
|---|---|---|---|---|
| 1 | 19.812 | 3.73 | 1.80400 | 46.6 |
| 2 | −80.555 | 0.70 | 1.95906 | 17.5 |
| 3 | 229.704 | (variable) | | |
| 4 | 312.257 | 0.40 | 2.00100 | 29.1 |
| 5 | 4.518 | 2.38 | | |
| 6 | −8.438 | 0.35 | 1.91082 | 35.3 |
| 7 | 72.812 | 0.41 | | |
| 8 | 23.290 | 1.37 | 1.95906 | 17.5 |
| 9 | −15.438 | (variable) | | |
| 10 (stop) | ∞ | (variable) | | |
| 11* | 4.313 | 2.50 | 1.58313 | 59.4 |
| 12* | −15.592 | 0.15 | | |
| 13 | 5.073 | 1.51 | 1.48749 | 70.2 |
| 14 | 29.323 | 0.35 | 2.00069 | 25.5 |
| 15 | 3.164 | 0.37 | | |
| 16 | 5.801 | 1.25 | 1.60311 | 60.6 |
| 17 | −16.218 | (variable) | | |
| 18 | ∞ | 1.10 | 1.51633 | 64.1 |
| 19 | ∞ | 1.80 | | |
| Image plane | ∞ | | | |

Data on aspherical surfaces

11th surface

K = 0.00000e+000 A4 = −1.24402e−003 A6 = −4.03182e−005
A8 = 8.84866e−007 A10 = −1.32893e−007 A12 = −4.32778e−009

12th surface

K = 0.00000e+000 A4 = 8.10344e−004

Other data
Zoom ratio 5.28

| | Wide-angle | Intermediate | Telephoto |
|---|---|---|---|
| Focal length | 2.23 | 6.77 | 11.75 |
| F-number | 1.44 | 1.93 | 2.41 |
| Half angle of view | 40.5 | 12.8 | 7.5 |
| Image height | 1.58 | 1.58 | 1.58 |
| Total lens length | 36.63 | 36.63 | 36.63 |
| BF | 4.28 | 6.05 | 7.82 |
| d 3 | 0.83 | 8.85 | 10.83 |
| d 9 | 11.25 | 3.22 | 1.25 |
| d10 | 4.81 | 3.04 | 1.27 |
| d17 | 1.75 | 3.52 | 5.29 |

Numerical Example 4

Unit: mm

Data on surfaces

| Surface No. | r | d | nd | νd |
|---|---|---|---|---|
| 1 | 29.819 | 3.08 | 1.77250 | 49.6 |
| 2 | −202.547 | 0.70 | 1.95906 | 17.5 |
| 3 | 898.160 | (variable) | | |
| 4 | −432.245 | 0.40 | 1.91082 | 35.3 |
| 5 | 4.608 | 2.11 | | |
| 6 | −11.549 | 0.35 | 1.76493 | 50.2 |
| 7 | 34.272 | 0.33 | | |
| 8 | 13.264 | 1.02 | 1.95906 | 17.5 |
| 9 | −322.579 | (variable) | | |
| 10 (stop) | ∞ | (variable) | | |
| 11* | 4.929 | 2.80 | 1.55332 | 71.7 |
| 12* | −12.322 | 0.15 | | |
| 13 | 5.964 | 2.16 | 1.51145 | 55.9 |
| 14 | −22.561 | 0.35 | 2.00087 | 26.8 |
| 15 | 3.769 | 1.05 | | |
| 16 | 6.600 | 1.70 | 1.68035 | 41.9 |
| 17 | −12.764 | (variable) | | |
| 18 | ∞ | 1.10 | 1.51633 | 64.1 |
| 19 | ∞ | 1.80 | | |
| Image plane | ∞ | | | |

Data on aspherical surfaces

11th surface

K = 0.00000e+000 A4 = −9.52184e−004 A6 = −2.14554e−005
A8 = 9.10370e−007 A10 = −1.04537e−007 A12 = 1.13956e−009

12th surface

K = 0.00000e+000 A4 = 6.01782e−004

Other data
Zoom ratio 5.35

| | Wide-angle | Intermediate | Telephoto |
|---|---|---|---|
| Focal length | 2.12 | 7.26 | 11.35 |
| F-number | 1.42 | 1.99 | 2.57 |
| Half angle of view | 42.5 | 12.2 | 7.9 |
| Image height | 1.58 | 1.58 | 1.58 |
| Total lens length | 40.74 | 40.74 | 40.74 |
| BF | 4.11 | 7.78 | 11.45 |
| d 3 | 1.81 | 11.11 | 10.67 |
| d 9 | 9.87 | 0.57 | 1.01 |
| d10 | 8.75 | 5.08 | 1.40 |
| d17 | 1.58 | 5.25 | 8.93 |

Numerical Example 5

Unit: mm

Data on surfaces

| Surface No. | r | d | nd | νd |
|---|---|---|---|---|
| 1 | 25.950 | 3.47 | 1.77250 | 49.6 |
| 2 | −71.297 | 0.70 | 1.95906 | 17.5 |
| 3 | −739.279 | (variable) | | |
| 4 | −79.464 | 0.40 | 1.91082 | 35.3 |
| 5 | 4.712 | 2.02 | | |
| 6 | −11.253 | 0.35 | 1.74594 | 51.7 |
| 7 | 27.212 | 0.39 | | |
| 8 | 13.815 | 1.08 | 1.95906 | 17.5 |
| 9 | −82.720 | (variable) | | |
| 10 (stop) | ∞ | (variable) | | |
| 11* | 4.809 | 2.78 | 1.55332 | 71.7 |
| 12* | −12.538 | 0.15 | | |
| 13 | 5.611 | 2.01 | 1.49222 | 72.7 |
| 14 | −30.351 | 0.35 | 1.98593 | 30.4 |
| 15 | 3.583 | 0.86 | | |
| 16 | 5.802 | 1.71 | 1.62894 | 59.2 |
| 17 | −11.595 | (variable) | | |
| 18 | ∞ | 1.10 | 1.51633 | 64.1 |
| 19 | ∞ | 1.80 | | |
| Image plane | ∞ | | | |

Data on aspherical surfaces

11th surface

K = 0.00000e+000 A4 = −9.59138e−004 A6 = −2.19822e−005
A8 = 8.83253e−007 A10 = −1.14950e−007 A12 = 1.31146e−009

-continued

Unit: mm

12th surface

K = 0.00000e+000  A4 = 7.23489e−004

Other data
Zoom ratio 5.05

|  | Wide-angle | Intermediate | Telephoto |
|---|---|---|---|
| Focal length | 2.24 | 7.19 | 11.32 |
| F-number | 1.44 | 1.99 | 2.57 |
| Half angle of view | 40.9 | 12.3 | 7.9 |
| Image height | 1.58 | 1.58 | 1.58 |
| Total lens length | 38.96 | 38.96 | 38.96 |
| BF | 4.12 | 7.05 | 9.99 |
| d 3 | 1.45 | 9.91 | 10.28 |
| d 9 | 9.97 | 1.50 | 1.14 |
| d10 | 7.14 | 4.20 | 1.27 |
| d17 | 1.59 | 4.52 | 7.46 |

Numerical Example 6

Unit: mm

Data on surfaces

| Surface No. | r | d | nd | vd |
|---|---|---|---|---|
| 1 | 15.895 | 3.25 | 1.77250 | 49.6 |
| 2 | −142.878 | 0.70 | 1.95906 | 17.5 |
| 3 | 108.644 | (variable) | | |
| 4 | 108.363 | 0.40 | 2.00100 | 29.1 |
| 5 | 4.255 | 2.29 | | |
| 6 | −8.593 | 0.35 | 1.91082 | 35.3 |
| 7 | 57.441 | 0.38 | | |
| 8 | 18.727 | 1.33 | 1.95906 | 17.5 |
| 9 | −17.924 | (variable) | | |
| 10 (stop) | ∞ | (variable) | | |
| 11* | 5.121 | 2.57 | 1.55332 | 71.7 |
| 12* | −11.998 | 0.15 | | |
| 13 | 4.401 | 2.09 | 1.49700 | 81.5 |
| 14 | 40.127 | 0.35 | 2.00100 | 29.1 |
| 15 | 3.275 | 0.49 | | |
| 16 | 7.743 | 1.31 | 1.49700 | 81.5 |
| 17 | −9.887 | (variable) | | |
| 18 | ∞ | 1.10 | 1.51633 | 64.1 |
| 19 | ∞ | 1.80 | | |
| Image plane | ∞ | | | |

Data on aspherical surfaces

11th surface

K = 0.00000e+000  A4 = −8.50359e−004  A6 = −2.41097e−006
A8 = −1.36176e−006  A10 = 8.44797e−008  A12 = −3.34219e−009

12th surface

K = 0.00000e+000  A4 = 7.83595e−004

Other data
Zoom ratio 5.92

|  | Wide-angle | Intermediate | Telephoto |
|---|---|---|---|
| Focal length | 2.41 | 8.28 | 14.26 |
| F-number | 1.44 | 1.97 | 2.54 |
| Half angle of view | 37.8 | 10.6 | 6.2 |
| Image height | 1.58 | 1.58 | 1.58 |
| Total lens length | 36.63 | 36.63 | 36.63 |
| BF | 4.14 | 6.32 | 8.49 |
| d 3 | 0.82 | 8.56 | 9.95 |
| d 9 | 10.13 | 2.39 | 1.00 |
| d10 | 5.88 | 3.70 | 1.52 |
| d17 | 1.61 | 3.79 | 5.97 |

Numerical Example 7

Unit: mm

Data on surfaces

| Surface No. | r | d | nd | vd |
|---|---|---|---|---|
| 1 | 15.910 | 3.25 | 1.77250 | 49.6 |
| 2 | −143.392 | 0.70 | 1.95906 | 17.5 |
| 3 | 108.904 | (variable) | | |
| 4 | 108.658 | 0.40 | 2.00100 | 29.1 |
| 5 | 4.256 | 2.30 | | |
| 6 | −8.495 | 0.35 | 1.91082 | 35.3 |
| 7 | 64.019 | 0.37 | | |
| 8 | 19.060 | 1.33 | 1.95906 | 17.5 |
| 9 | −17.721 | (variable) | | |
| 10 (stop) | ∞ | (variable) | | |
| 11* | 5.097 | 2.58 | 1.55332 | 71.7 |
| 12* | −11.964 | 0.15 | | |
| 13 | 4.413 | 2.07 | 1.49700 | 81.5 |
| 14 | 39.855 | 0.35 | 2.00100 | 29.1 |
| 15 | 3.275 | 0.49 | | |
| 16 | 7.753 | 1.31 | 1.49700 | 81.5 |
| 17 | −9.948 | (variable) | | |
| 18 | ∞ | 1.10 | 1.51633 | 64.1 |
| 19 | ∞ | 1.80 | | |
| Image plane | ∞ | | | |

Data on aspherical surfaces

11th surface

K = 0.00000e+000  A4 = −8.54095e−004  A6 = −7.35954e−006
A8 = −5.82646e−007  A10 = 2.51813e−008  A12 = −1.76367e−009

12th surface

K = 0.00000e+000  A4 = 7.89520e−004

Other data
Zoom ratio 5.92

|  | Wide-angle | Intermediate | Telephoto |
|---|---|---|---|
| Focal length | 2.41 | 8.27 | 14.26 |
| F-number | 1.44 | 1.97 | 2.54 |
| Half angle of view | 37.8 | 10.6 | 6.2 |
| Image height | 1.58 | 1.58 | 1.58 |
| Total lens length | 36.63 | 36.63 | 36.63 |
| BF | 4.14 | 6.31 | 8.48 |
| d 3 | 0.82 | 8.56 | 9.96 |
| d 9 | 10.14 | 2.40 | 1.00 |
| d10 | 5.87 | 3.69 | 1.52 |
| d17 | 1.61 | 3.78 | 5.96 |

Numerical Example 8

Unit: mm

Data on surfaces

| Surface No. | r | d | nd | vd |
|---|---|---|---|---|
| 1 | 29.819 | 3.08 | 1.77250 | 49.6 |
| 2 | −202.547 | 0.70 | 1.95906 | 17.5 |
| 3 | 898.160 | (variable) | | |
| 4 | −432.245 | 0.40 | 1.91082 | 35.3 |
| 5 | 4.608 | 2.11 | | |
| 6 | −11.549 | 0.35 | 1.76493 | 50.2 |
| 7 | 34.272 | 0.33 | | |
| 8 | 13.264 | 1.02 | 1.95906 | 17.5 |
| 9 | −322.579 | (variable) | | |

-continued

Unit: mm

| | | | | |
|---|---|---|---|---|
| 10 (stop) | ∞ | (variable) | | |
| 11* | 4.929 | 2.80 | 1.55332 | 71.7 |
| 12* | −12.322 | 0.15 | | |
| 13 | 5.964 | 2.16 | 1.51145 | 55.9 |
| 14 | −22.561 | 0.35 | 2.00087 | 26.8 |
| 15 | 3.769 | 1.05 | | |
| 16 | 6.600 | 1.70 | 1.68035 | 41.9 |
| 17 | −12.764 | (variable) | | |
| 18 | ∞ | 1.10 | 1.51633 | 64.1 |
| 19 | ∞ | 1.80 | | |
| Image plane | ∞ | | | |

Data on aspherical surfaces

11th surface

K = 0.00000e+000 A4 = −9.52184e−004 A6 = −2.14554e−005
A8 = 9.10370e−007 A10 = −1.04537e−007 A12 = 1.13956e−009

12th surface

K = 0.00000e+000 A4 = 6.01782e−004

Other data
Zoom ratio 5.35

| | Wide-angle | Intermediate | Telephoto |
|---|---|---|---|
| Focal length | 2.12 | 7.26 | 11.35 |
| F-number | 1.42 | 1.99 | 2.57 |
| Half angle of view | 42.5 | 12.2 | 7.9 |
| Image height | 1.58 | 1.58 | 1.58 |
| Total lens length | 40.74 | 40.74 | 40.74 |
| BF | 4.11 | 7.78 | 11.45 |
| d 3 | 1.81 | 11.11 | 10.67 |
| d 9 | 9.87 | 0.57 | 1.01 |
| d10 | 8.75 | 5.08 | 1.40 |
| d17 | 1.58 | 5.25 | 8.93 |

Numerical Example 9

Unit: mm

Data on surfaces

| Surface No. | r | d | nd | νd |
|---|---|---|---|---|
| 1 | 25.950 | 3.47 | 1.77250 | 49.6 |
| 2 | −71.297 | 0.70 | 1.95906 | 17.5 |
| 3 | −739.279 | (variable) | | |
| 4 | −79.464 | 0.40 | 1.91082 | 35.3 |
| 5 | 4.712 | 2.02 | | |
| 6 | −11.253 | 0.35 | 1.74594 | 51.7 |
| 7 | 27.212 | 0.39 | | |
| 8 | 13.815 | 1.08 | 1.95906 | 17.5 |
| 9 | −82.720 | (variable) | | |
| 10 (stop) | ∞ | (variable) | | |
| 11* | 4.809 | 2.78 | 1.55332 | 71.7 |
| 12* | −12.538 | 0.15 | | |
| 13 | 5.611 | 2.01 | 1.49222 | 72.7 |
| 14 | −30.351 | 0.35 | 1.98593 | 30.4 |
| 15 | 3.583 | 0.86 | | |
| 16 | 5.802 | 1.71 | 1.62894 | 59.2 |
| 17 | −11.595 | (variable) | | |
| 18 | ∞ | 1.10 | 1.51633 | 64.1 |
| 19 | ∞ | 1.80 | | |
| Image plane | ∞ | | | |

Data on aspherical surfaces

11th surface

K = 0.00000e+000 A4 = −9.59138e−004 A6 = −2.19822e−005 A8 = 8.83253e−007 A10 = −1.14950e−007 A12 = 1.31146e−009

12th surface

K = 0.00000e+000 A4 = 7.23489e−004

Other data
Zoom ratio 5.05

| | Wide-angle | Intermediate | Telephoto |
|---|---|---|---|
| Focal length | 2.24 | 7.19 | 11.32 |
| F-number | 1.44 | 1.99 | 2.57 |
| Half angle of view | 40.9 | 12.3 | 7.9 |
| Image height | 1.58 | 1.58 | 1.58 |
| Total lens length | 38.96 | 38.96 | 38.96 |
| BF | 4.12 | 7.05 | 9.99 |
| d 3 | 1.45 | 9.91 | 10.28 |
| d 9 | 9.97 | 1.50 | 1.14 |
| d10 | 7.14 | 4.20 | 1.27 |
| d17 | 1.59 | 4.52 | 7.46 |

Numerical Example 10

Unit: mm

Data on surfaces

| Surface No. | r | d | nd | ν |
|---|---|---|---|---|
| 1 | 15.895 | 3.25 | 1.77250 | 49.6 |
| 2 | −142.878 | 0.70 | 1.95906 | 17.5 |
| 3 | 108.644 | (variable) | | |
| 4 | 108.363 | 0.40 | 2.00100 | 29.1 |
| 5 | 4.255 | 2.29 | | |
| 6 | −8.593 | 0.35 | 1.91082 | 35.3 |
| 7 | 57.441 | 0.38 | | |
| 8 | 18.727 | 1.33 | 1.95906 | 17.5 |
| 9 | −17.924 | (variable) | | |
| 10 (stop) | ∞ | (variable) | | |
| 11* | 5.121 | 2.57 | 1.55332 | 71.7 |
| 12* | −11.998 | 0.15 | | |
| 13 | 4.401 | 2.09 | 1.49700 | 81.5 |
| 14 | 40.127 | 0.35 | 2.00100 | 29.1 |
| 15 | 3.275 | 0.49 | | |
| 16 | 7.743 | 1.31 | 1.49700 | 81.5 |
| 17 | −9.887 | (variable) | | |
| 18 | ∞ | 1.10 | 1.51633 | 64.1 |
| 19 | ∞ | 1.80 | | |
| Image plane | ∞ | | | |

Data on aspherical surfaces

11th surface

K = 0.00000e+000 A4 = −8.50359e−004 A6 = −2.41097e−006
A8 = −1.36176e−006 A10 = 8.44797e−008 A12 = −3.34219e−009

12th surface

K = 0.00000e+000 A4 = 7.83595e−004

Other data
Zoom ratio 5.92

| | Wide-angle | Intermediate | Telephoto |
|---|---|---|---|
| Focal length | 2.41 | 8.28 | 14.26 |
| F-number | 1.44 | 1.97 | 2.54 |
| Half angle of view | 37.8 | 10.6 | 6.2 |
| Image height | 1.58 | 1.58 | 1.58 |
| Total lens length | 36.63 | 36.63 | 36.63 |
| BF | 4.14 | 6.32 | 8.49 |
| d 3 | 0.82 | 8.56 | 9.95 |
| d 9 | 10.13 | 2.39 | 1.00 |
| d10 | 5.88 | 3.70 | 1.52 |
| d17 | 1.61 | 3.79 | 5.97 |

Numerical Example 11

Unit: mm

Data on surfaces

| Surface No. | r | d | nd | νd |
|---|---|---|---|---|
| 1 | 18.105 | 3.70 | 1.77250 | 49.6 |
| 2 | -65.729 | 0.70 | 1.95906 | 17.5 |
| 3 | 336.527 | (variable) | | |
| 4 | -171.930 | 0.40 | 1.95375 | 32.3 |
| 5 | 4.408 | 2.19 | | |
| 6 | -8.233 | 0.35 | 1.91082 | 35.3 |
| 7 | 60.415 | 0.43 | | |
| 8 | 21.515 | 1.29 | 1.95906 | 17.5 |
| 9 | -17.462 | (variable) | | |
| 10 (stop) | ∞ | (variable) | | |
| 11* | 4.979 | 3.01 | 1.55332 | 71.7 |
| 12* | -12.434 | 0.15 | | |
| 13 | 4.832 | 1.75 | 1.49700 | 81.5 |
| 14 | 25.948 | 0.35 | 2.00100 | 29.1 |
| 15 | 3.451 | 0.65 | | |
| 16 | 5.575 | 1.60 | 1.49700 | 81.5 |
| 17 | -10.430 | (variable) | | |
| 18 | ∞ | 1.10 | 1.51633 | 64.1 |
| 19 | ∞ | 1.81 | | |
| Image plane | ∞ | | | |

Data on aspherical surfaces

11th surface

K = 0.00000e+000 A4 = -9.20439e-004 A6 = -1.83244e-005
A8 = 1.20367e-006 A10 = -1.28650e-007 A12 = 2.41800e-009

12th surface

K = 0.00000e+000 A4 = 8.51021e-004

Other data
Zoom ratio 4.83

| | Wide-angle | Intermediate | Telephoto |
|---|---|---|---|
| Focal length | 2.32 | 6.82 | 11.20 |
| F-number | 1.44 | 1.91 | 2.39 |
| Half angle of view | 39.7 | 12.9 | 7.9 |
| Image height | 1.58 | 1.58 | 1.58 |
| Total lens length | 36.64 | 36.64 | 36.64 |
| BF | 4.14 | 6.19 | 8.24 |
| d 3 | 0.94 | 7.94 | 9.28 |
| d 9 | 9.58 | 2.58 | 1.24 |
| d10 | 5.40 | 3.35 | 1.30 |
| d17 | 1.60 | 3.65 | 5.70 |

Numerical Example 12

Unit: mm

Data on surfaces

| Surface No. | r | d | nd | νd |
|---|---|---|---|---|
| 1 | 39.354 | 2.14 | 1.80400 | 46.6 |
| 2 | -41.678 | 0.70 | 1.95906 | 17.5 |
| 3 | -101.107 | (variable) | | |
| 4 | -20.995 | 0.40 | 2.00100 | 29.1 |
| 5 | 8.910 | 1.46 | | |
| 6 | -13.093 | 0.35 | 1.95375 | 32.3 |
| 7 | 19.015 | 0.92 | | |
| 8 | 25.327 | 1.85 | 1.95906 | 17.5 |
| 9 | -17.519 | (variable) | | |
| 10 (stop) | ∞ | (variable) | | |
| 11* | 5.537 | 2.78 | 1.55332 | 71.7 |
| 12* | -17.457 | 0.42 | | |
| 13 | 4.784 | 2.28 | 1.49700 | 81.5 |
| 14 | 46.680 | 0.35 | 2.00100 | 29.1 |
| 15 | 3.417 | 0.82 | | |
| 16 | 6.246 | 1.73 | 1.59522 | 67.7 |
| 17 | -24.609 | (variable) | | |
| 18 | ∞ | 1.10 | 1.51633 | 64.1 |
| 19 | ∞ | 1.80 | | |
| Image plane | ∞ | | | |

Data on aspherical surfaces

11th surface

K = 0.00000e+000 A4 = -5.71270e-004 A6 = -2.66400e-007
A8 = -1.42974e-006 A10 = 8.83596e-008 A12 = -2.67530e-009

12th surface

K = 0.00000e+000 A4 = 4.11553e-004

Other data
Zoom ratio 5.12

| | Wide-angle | Intermediate | Telephoto |
|---|---|---|---|
| Focal length | 2.68 | 8.43 | 13.75 |
| F-number | 1.44 | 1.98 | 2.51 |
| Half angle of view | 36.2 | 10.4 | 6.5 |
| Image height | 1.58 | 1.58 | 1.58 |
| Total lens length | 41.74 | 41.74 | 41.74 |
| BF | 4.29 | 7.02 | 9.76 |
| d 3 | 1.60 | 11.97 | 13.38 |
| d 9 | 12.78 | 2.41 | 1.00 |
| d10 | 6.87 | 4.14 | 1.40 |
| d17 | 1.76 | 4.50 | 7.23 |

Numerical Example 13

Unit: mm

Data on surfaces

| Surface No. | r | d | nd | νd |
|---|---|---|---|---|
| 1 | 18.530 | 3.33 | 1.77250 | 49.6 |
| 2 | -287.380 | 0.70 | 1.95906 | 17.5 |
| 3 | 91.280 | (variable) | | |
| 4 | 23.352 | 0.40 | 2.05090 | 26.9 |
| 5 | 4.468 | 2.83 | | |
| 6 | -9.213 | 0.35 | 1.83481 | 42.7 |
| 7 | 88.329 | 0.33 | | |
| 8 | 19.511 | 1.29 | 1.98738 | 16.4 |
| 9 | -26.019 | (variable) | | |
| 10 (Stop) | ∞ | (variable) | | |
| 11* | 4.945 | 2.50 | 1.55332 | 71.7 |
| 12* | -13.459 | 0.15 | | |
| 13 | 4.228 | 2.12 | 1.49700 | 81.5 |
| 14 | 49.391 | 0.35 | 2.00100 | 29.1 |
| 15 | 2.990 | 0.62 | | |
| 16 | 5.476 | 1.40 | 1.49700 | 81.5 |
| 17 | -12.319 | (variable) | | |
| 18 | ∞ | 1.10 | 1.51633 | 64.1 |
| 19 | ∞ | 1.22 | | |
| Image plane | ∞ | | | |

Data on aspherical surfaces

11th surface

K = 0.00000e+000 A4 = -7.98794e-004 A6 = -1.88755e-005
A8 = 1.06394e-006 A10 = -1.28564e-007 A12 = 2.76670e-009

-continued

Unit: mm

12th surface

K = 0.00000e+000 A4 = 6.97932e−004

Other data
Zoom ratio 6.00

|  | Wide-angle | Intermediate | Telephoto |
|---|---|---|---|
| Focal length | 2.36 | 8.45 | 14.14 |
| F-number | 1.44 | 2.00 | 2.56 |
| Half angle of view | 37.1 | 10.4 | 6.27 |
| Image height | 1.58 | 1.58 | 1.58 |
| Total lens length | 39.25 | 39.63 | 38.97 |
| BF | 3.67 | 5.68 | 7.70 |
| d3 | 0.82 | 11.10 | 12.47 |
| d9 | 12.92 | 3.02 | 1.00 |
| d10 | 5.48 | 3.46 | 1.45 |
| d17 | 1.72 | 3.74 | 5.75 |

TABLE 1

| Conditional expressions | Numerical examples | | | | | |
|---|---|---|---|---|---|---|
|  | 1 | 2 | 3 | 4 | 5 | 6 |
| (1) | 0.50 | 0.51 | 0.48 | 0.55 | 0.55 | 0.50 |
| (2) | 1.63 | 1.44 | 1.83 | 1.00 | 1.21 | 1.55 |
| (3) | 0.75 | 0.67 | 0.75 | 0.66 | 0.68 | 0.68 |
| (4) | 7.92 | 6.63 | 9.03 | 9.79 | 8.74 | 10.13 |
| (5) | 1.89 | 1.92 | 1.96 | 1.84 | 1.83 | 1.96 |
| (6) | 81.54 | 70.23 | 70.23 | 72.70 | 81.54 | 70.23 |
| (7) | 0.065 | 0.068 | 0.068 | 0.059 | 0.061 | 0.068 |

TABLE 2

| Conditional expressions | Numerical examples | | | | |
|---|---|---|---|---|---|
|  | 1 | 2 | 3 | 7 | 8 |
| (4) | 6.07 | 6.34 | 5.89 | 5.49 | 8.62 |
| (8) | 13.04 | 12.24 | 12.81 | 10.51 | 19.65 |
| (9) | 2.73 | 2.94 | 2.63 | 2.54 | 3.90 |
| (10) | 1.87 | 1.87 | 1.88 | 1.87 | 1.87 |
| (11) | −0.60 | −0.82 | −0.61 | −0.80 | −0.74 |

TABLE 3

| Conditional expressions | Numerical examples | | | |
|---|---|---|---|---|
|  | 9 | 10 | 11 | 12 |
| (4) | 7.29 | 5.50 | 6.01 | 6.03 |
| (8) | 15.65 | 10.50 | 11.48 | 14.33 |
| (9) | 3.41 | 2.54 | 2.87 | 2.87 |
| (10) | 1.87 | 1.87 | 1.87 | 1.88 |
| (11) | −0.47 | −0.80 | −0.57 | −0.03 |

TABLE 4

| Conditional expressions | Numerical examples | | | | |
|---|---|---|---|---|---|
|  | 1 | 2 | 3 | 7 | 8 |
| (4) | 6.07 | 6.34 | 5.89 | 5.49 | 8.62 |
| (12) | 2.001 | 2.001 | 2.001 | 2.001 | 1.911 |
| (13) | −0.93 | −1.08 | −1.03 | −1.08 | −0.98 |
| (14) | 2.15 | 1.93 | 2.18 | 1.91 | 2.28 |

TABLE 4-continued

| Conditional expressions | Numerical examples | | | | |
|---|---|---|---|---|---|
|  | 1 | 2 | 3 | 7 | 8 |
| (15) | 2.85 | 2.89 | 2.91 | 2.80 | 3.48 |
| (16) | 13.03 | 12.24 | 12.81 | 10.51 | 19.65 |

TABLE 5

| Conditional expressions | Numerical examples | | | | |
|---|---|---|---|---|---|
|  | 9 | 10 | 11 | 12 | 13 |
| (4) | 7.29 | 5.50 | 6.01 | 6.03 | 5.84 |
| (12) | 1.911 | 2.001 | 1.954 | 2.001 | 2.051 |
| (13) | −0.89 | −1.08 | −0.95 | −0.40 | −1.47 |
| (14) | 2.15 | 1.91 | 1.91 | 2.37 | 2.30 |
| (15) | 3.17 | 2.80 | 2.91 | 2.95 | 2.91 |
| (16) | 15.65 | 10.50 | 11.48 | 14.33 | 13.45 |

Referring now to FIG. 27, a digital still camera (image pickup apparatus) as another embodiment will be described in which the zoom lens according to any of Embodiments 1 to 13 serves as an imaging optical system. The digital still camera illustrated in FIG. 27 includes a camera body 10, an imaging optical system 11 corresponding to the zoom lens according to any of Embodiments 1 to 13, a solid-state image pickup device (photoelectric conversion device) 12, such as a CCD sensor or a CMOS sensor, provided in the camera body 10 and that receives an optical image of an object formed by the imaging optical system 11, a memory 13 that stores information relating to the optical image of the object obtained through photoelectric conversion performed by the solid-state image pickup device 12, and a network cable 14 that transfers information stored in the memory 13.

If the zoom lens according to any of Embodiments 1 to 13 of the present invention is applied to an image pickup apparatus such as a digital still camera, an image pickup apparatus, the entire system of the zoom lens being small, having a high zoom ratio, and having high optical performance in the entire zoom range, can be provided.

An image pickup system (monitoring camera system) including the zoom lens according to any of Embodiments 1 to 13 of the present invention and a control unit that controls the zoom lens may be provided. In this case, the control unit may control the zoom lens so that the above-described conditional expressions are satisfied. At this time, the control unit does not have to be integrally formed with the zoom lens. For example, a control unit in a control device disposed in a remote place may transmit a command (signal) to a driving unit that drives the respective lenses of the zoom lens, and hence the zoom lens may be remotely operated.

Also, the control device may include an operation unit, such as a controller for operating the zoom lens and a button, and hence the zoom lens may be controlled in accordance with an input on the operation unit by a user. For example, the operation unit may include an enlargement button and a reduction button, and the control device may transmit a signal to the driving unit so that the magnification of the zoom lens is increased when the user presses the enlargement button and the magnification of the zoom lens is reduced when the user presses the reduction button.

The control device may also include a display unit such as a liquid crystal panel that displays information (moving state) relating to zooming of the zoom lens. The information relating to zooming of the zoom lens includes, for example, zooming magnification (zooming state) and a moving amount (moving state) of each lens unit. In this case, the user can remotely operate the zoom lens by using the operation unit while watching the information relating to zooming of the zoom lens displayed on the display unit. At this time, the display unit and the operation unit may be integrally formed by employing, for example, a touch panel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-239811 filed Dec. 9, 2016, No. 2016-239812 filed Dec. 9, 2016, and No. 2016-239813 filed Dec. 9, 2016, which are hereby incorporated by reference herein in their entirety.

What is claimed is:

1. A zoom lens consisting of, in order from an object side to an image side:
a first lens unit having a positive refractive power;
a second lens unit having a negative refractive power; and
a third lens unit having a positive refractive power,
wherein the first lens unit does not move and the second lens unit and the third lens unit move in mutually different loci during zooming, and
wherein conditional expressions are satisfied as follows:

$$0.45 < |f2/m2| < 0.59, \text{ and}$$

$$0.20 < |f3/m3| < 1.95,$$

where f2 is a focal length of the second lens unit, f3 is a focal length of the third lens unit, m2 is a moving amount of the second lens unit during zooming from a wide-angle end to a telephoto end, and m3 is a moving amount of the third lens unit during zooming from the wide-angle end to the telephoto end.

2. The zoom lens according to claim 1, wherein a conditional expression is satisfied as follows:

$$0.40 < |f2/f3| < 1.20.$$

3. The zoom lens according to claim 1, wherein the first lens unit includes a cemented lens in which a positive lens and a negative lens arranged on the image side of the positive lens are cemented.

4. The zoom lens according to claim 1, wherein a conditional expression is satisfied as follows:

$$4.00 < |f1/f2| < 20.00,$$

where f1 is a focal length of the first lens unit.

5. The zoom lens according to claim 1, wherein the second lens unit includes at least two negative lenses, and wherein a conditional expression is satisfied as follows:

$$1.70 < nd2n < 2.30,$$

where nd2n is an average value of refractive indices of materials of negative lenses included in the second lens unit.

6. The zoom lens according to claim 1, wherein the third lens unit includes at least two positive lenses, and wherein a conditional expression is satisfied as follows:

$$60.00 < vd3p < 98.00,$$

where vd3p is an Abbe number of a material having a largest Abbe number among Abbe numbers of materials of positive lenses included in the third lens unit.

7. The zoom lens according to claim 1, further comprising:
an aperture stop arranged between the second lens unit and the third lens unit, the aperture stop configured not to move during zooming,
wherein a conditional expression is satisfied as follows:

$$0.030 < d23t/TLt < 0.100,$$

where d23t is a distance on an optical axis between the second lens unit and the third lens unit at the telephoto end, and TLt is a total length of the zoom lens at the telephoto end.

8. The zoom lens according to claim 1, wherein the third lens unit consists of, in order from the object side to the image side, a positive lens, a cemented lens in which a positive lens and a negative lens are cemented, and a positive lens.

9. The zoom lens according to claim 1, wherein the third lens unit consists of, in order from the object side to the image side, a positive lens, a negative lens, and a positive lens.

10. An image pickup apparatus comprising:
the zoom lens according to claim 1; and
an image pickup device configured to receive light from the zoom lens.

11. A control device configured to control the zoom lens of claim 1, comprising:
a control unit configured to control the zoom lens so that the conditional expressions in claim 1 are satisfied during zooming.

12. The control device according to claim 11, further comprising an operation unit configured to operate the zoom lens.

13. The control device according to claim 11, further comprising a display unit configured to display information relating to zooming of the zoom lens.

14. A zoom lens consisting of, in order from an object side to an image side:
a first lens unit having a positive refractive power;
a second lens unit having a negative refractive power; and
a third lens unit having a positive refractive power,
wherein a distance between adjacent ones of the lens units is changed during zooming from a wide-angle end to a telephoto end so that a distance between the first lens unit and the second lens unit is increased and a distance between the second lens unit and the third lens unit is decreased,
wherein the first lens unit consists of, in order from the object side to the image side, a positive lens and a negative lens,
wherein the second lens unit includes two negative lenses, and
wherein a conditional expression is satisfied as follows:

$$7.00 < f1/fw < 30.00,$$

where f1 is a focal length of the first lens unit, and fw is a focal length of the zoom lens at the wide-angle end.

15. The zoom lens according to claim 14, wherein the first lens unit consists of a cemented lens in which a positive lens and a negative lens are cemented, and a cemented surface of the cemented lens has a shape convex toward the image side.

16. The zoom lens according to claim 14, further comprising an aperture stop arranged between the second lens unit and the third lens unit, the aperture stop configured not to move during zooming.

17. The zoom lens according to claim 14,
wherein a conditional expression is satisfied as follows:

$$2.00<f1/L12t<5.00,$$

where L12t is a distance from a lens surface vertex on a most image side of the first lens unit to a lens surface vertex on a most object side of the second lens unit at the telephoto end.

18. The zoom lens according to claim 14,
wherein a conditional expression is satisfied as follows:

$$1.75<(Ndp+Ndn)/2<2.30,$$

where Ndp is a refractive index of the positive lens included in the first lens unit for a d-line, and Ndn is a refractive index of the negative lens included in the first lens unit for the d-line.

19. The zoom lens according to claim 14,
wherein a conditional expression is satisfied as follows:

$$-1.00<(r1+r2)/(r1-r2)<0.50,$$

where r1 is a curvature radius of a lens surface on the object side of the positive lens included in the first lens unit, and r2 is a curvature radius of a lens surface on the image side of the positive lens included in the first lens unit.

20. A zoom lens comprising, in order from an object side to an image side:
a first lens unit having a positive refractive power;
a second lens unit having a negative refractive power; and
a third lens unit having a positive refractive power,
wherein a distance between adjacent ones of the lens units is changed during zooming, wherein the second lens unit includes a negative lens G2n arranged on a most object side in the second lens unit, a positive lens, a negative lens, and
wherein conditional expressions are satisfied as follows:

$$1.91<nd2n<2.40,$$

$$-1.50<(R2+R1)/(R2-R1)<-0.10, \text{ and}$$

$$1.00<|f2/fw|<4.00,$$

where R1 is a curvature radius of a lens surface on the object side of the negative lens G2n, R2 is a curvature radius of a lens surface on the image side of the negative lens G2n, nd2n is a refractive index of a material of the negative lens G2n for a d-line, f2 is a focal length of the second lens unit, and fw is a focal length of the zoom lens at a wide-angle end.

21. The zoom lens according to claim 20,
wherein a conditional expression is satisfied as follows:

$$1.50<f3/fw<5.00,$$

where f3 is a focal length of the third lens unit, and fw is a focal length of the zoom lens at a wide-angle end.

22. The zoom lens according to claim 20,
wherein a conditional expression is satisfied as follows:

$$7.00<f1/fw<30.00,$$

where f1 is a focal length of the first lens unit, and fw is a focal length of the zoom lens at a wide-angle end.

23. A zoom lens comprising, in order from an object side to an image side:
a first lens unit having a positive refractive power;
a second lens unit having a negative refractive power; and
a third lens unit having a positive refractive power,
wherein a distance between adjacent ones of the lens units is changed during zooming,
wherein the second lens unit includes a negative lens G2n arranged on a most object side in the second lens unit, and
wherein conditional expressions are satisfied as follows:

$$1.91<nd2n<2.40,$$

$$-1.50<(R2+R1)/(R2-R1)<-0.10,$$

$$1.00<|f2/fw|<4.00, \text{ and}$$

$$2.80 \leq f3/fw<5.00,$$

where R1 is a curvature radius of a lens surface on the object side of the negative lens G2n, R2 is a curvature radius of a lens surface on the image side of the negative lens G2n, nd2n is a refractive index of a material of the negative lens G2n for a d-line, f2 is a focal length of the second lens unit, f3 is a focal length of the third lens unit, and fw is a focal length of the zoom lens at a wide-angle end.

24. A zoom lens consisting of in order from an object side to an image side:
a first lens unit having a positive refractive power;
a second lens unit having a negative refractive power; and
a third lens unit having a positive refractive power,
wherein the first lens unit does not move and the second lens unit and the third lens unit move in mutually different loci during zooming,
wherein the first lens unit includes a cemented lens in which a positive lens and a negative lens arranged on the image side of the positive lens are cemented, and
wherein conditional expressions are satisfied as follows:

$$0.05<|f2/m2|<0.59, \text{ and}$$

$$0.20<|f3/m3|<1.95,$$

where f2 is a focal length of the second lens unit, f3 is a focal length of the third lens unit, m2 is a moving amount of the second lens unit during zooming from a wide-angle end to a telephoto end, and m3 is a moving amount of the third lens unit during zooming from the wide-angle end to the telephoto end.

25. A zoom lens consisting of, in order from an object side to an image side:
a first lens unit having a positive refractive power;
a second lens unit having a negative refractive power; and
a third lens unit having a positive refractive power,
wherein a distance between adjacent ones of the lens units is changed during zooming from a wide-angle end to a telephoto end so that a distance between the first lens unit and the second lens unit is increased and a distance between the second lens unit and the third lens unit is decreased,
wherein the first lens unit consists of, in order from the object side to the image side, a positive lens and a negative lens,
wherein the third lens unit consists of, in order from the object side to the image side, a positive lens, negative lens, and a positive lens, and wherein a conditional expression is satisfied as follows:

$7.00 < f1/fw < 30.00$, where f1 is a focal length of the first lens unit, and fw is a focal length of the zoom lens at the wide-angle end.

26. An image pickup apparatus comprising:
    the zoom lens of claim 14; and
    an image pickup device configured to receive light from the zoom lens.

27. An image pickup apparatus comprising:
    the zoom lens of claim 20; and
    an image pickup device configured to receive light from the zoom lens.

28. An image pickup apparatus comprising:
    the zoom lens of claim 23; and
    an image pickup device configured to receive light from the zoom lens.

29. An image pickup apparatus comprising:
    the zoom lens of claim 24; and
    an image pickup device configured to receive light from the zoom lens.

30. An image pickup apparatus comprising:
    the zoom lens of claim 25; and
    an image pickup device configured to receive light from the zoom lens.

\* \* \* \* \*